(12) United States Patent
Huang et al.

(10) Patent No.: US 7,805,312 B2
(45) Date of Patent: Sep. 28, 2010

(54) CONVERSATION CONTROL APPARATUS

(75) Inventors: Shengyang Huang, Tokyo (JP); Hiroshi Katukura, Tokyo (JP)

(73) Assignees: Universal Entertainment Corporation, Tokyo (JP); PTOPA, Inc., Tokyo (JP)

(*) Notice: Subject to any disclaimer, the term of this patent is extended or adjusted under 35 U.S.C. 154(b) by 775 days.

(21) Appl. No.: 11/582,304

(22) Filed: Oct. 18, 2006

(65) Prior Publication Data
US 2007/0094005 A1  Apr. 26, 2007

(30) Foreign Application Priority Data
Oct. 21, 2005  (JP) .............................. 2005-307864

(51) Int. Cl.
*G10L 21/00*  (2006.01)
*G10L 15/18*  (2006.01)

(52) U.S. Cl. ..................... 704/275; 704/257; 704/270

(58) Field of Classification Search ........................ None
See application file for complete search history.

(56) References Cited

U.S. PATENT DOCUMENTS

| | | | | |
|---|---|---|---|---|
| 5,860,059 | A * | 1/1999 | Aust et al. .................. | 704/231 |
| 6,983,252 | B2 * | 1/2006 | Matheson et al. ........... | 704/275 |
| 2003/0115062 | A1 * | 6/2003 | Walker et al. ............... | 704/258 |
| 2003/0191649 | A1 * | 10/2003 | Stout et al. .................. | 704/275 |
| 2005/0261902 | A1 * | 11/2005 | Bushey et al. ............... | 704/243 |
| 2008/0004881 | A1 * | 1/2008 | Attwater et al. ............. | 704/275 |

FOREIGN PATENT DOCUMENTS

| | | |
|---|---|---|
| CN | 1647069 A | 7/2005 |
| EP | 1 255 189 A1 | 11/2002 |
| WO | WO 03/085550 A1 | 10/2003 |

OTHER PUBLICATIONS

Chinese Office Action for corresponding Chinese Application No. 200610136039.1 dated Oct. 23, 2009 (with English translation).

* cited by examiner

*Primary Examiner*—Matthew J Sked
(74) *Attorney, Agent, or Firm*—Oliff & Berridge, PLC

(57) ABSTRACT

To return a predetermined answer in a predetermined order, even in the event that user utterance contents differ from an original objective. A conversation control apparatus, which transmits an answer sentence in response to a user utterance, includes: a conversation data base storing a plurality of plans each including the answer sentence and next candidate prescription information which prescribes a next candidate answer sentence, which is an answer sentence due to be transmitted in an order succeeding the answer sentence; and a planned conversation processor which, in response to a first user utterance, selects a plan stored in the conversation data base, transmits an answer sentence included in the plan and, subsequently, in response to a second user utterance, based on next candidate prescription information included in the plan, transmits a next candidate answer sentence, wherein at least one portion of the plurality of plans, regardless of contents of a user utterance, includes an answer sentence and next candidate answer sentence in such a way as to transmit each question in a predetermined survey in a predetermined order.

1 Claim, 24 Drawing Sheets

Fig. 7

| | TYPE OF UTTERED SENTENCE | DATA (SENTENCE) EXAMPLE |
|---|---|---|
| DA | DECLARATION AFFIRMATIVE SENTENCE | I LIKE SATO |
| LA | LOCATION AFFIRMATIVE SENTENCE | I LIKE SATO'S SERIOUS FACE WHEN HE IS IN THE BATTER BOX |
| NA | NEGATIVE AFFIRMATIVE SENTENCE | I DON'T WANT TO TALK WITH ANYONE WHO DOESN'T LIKE SATO |
| DQ | DECLARATION QUESTION | DO YOU LIKE SATO ? |
| LQ | LOCATION QUESTION | WHAT DO YOU LIKE ABOUT SATO WHEN HE IS IN THE BATTER BOX? |
| NQ | NEGATIVE QUESTION | IT IS NOT TRUE THAT YOU LIKE SATO, IS IT ? |
| ... | ... | ... |

Fig. 8

| DETERMINATION TYPE | DICTIONARY USED |
|---|---|
| D DETERMINATION | SPECIFICATION EXPRESSION DICTIONARY |
| N DETERMINATION | NEGATIVE EXPRESSION DICTIONARY |
| ⋮ | ⋮ |

Fig. 11

| | TOPIC TITLE (SECOND MORPHEME INFORMATION) 1001 | | 1002 | 1003 |
|---|---|---|---|---|
| | FIRST SPECIFICATION INFORMATION | | SECOND SPECIFICATION INFORMATION | THIRD SPECIFICATION INFORMATION |
| TOPIC SPECIFICATION INFORMATION (="THE SEVEN SAMURAI") — 810D₁ | THE SEVEN SAMURAI | | * | * — 820₁ |
| | THE SEVEN SAMURAI | | * | INTERESTING — 820₂ |
| | ... | | ... | ... |
| TOPIC SPECIFICATION INFORMATION (="RAN") — 810D₂ | RAN | | * | * — 820₃ |
| | RAN | | * | INTERESTING — 820₄ |
| | ... | | ... | ... |
| TOPIC SPECIFICATION INFORMATION (="THE BODYGUARD") — 810D₃ | THE BODYGUARD | | * | * — 820₅ |
| | THE BODYGUARD | | * | INTERESTING — 820₆ |
| | ... | | ... | ... |

Fig. 12

| TYPE | CONTENTS |
|---|---|
| D | DECLARATION SENTENCE |
| T | A SENTENCE IN WHICH A DECLARATION SENTENCE IS COMPOSED OF A TIME CONCEPT SUCH AS "WHEN" |
| L | A SENTENCE IN WHICH A DECLARATION SENTENCE IS COMPOSED OF A LOCATION CONCEPT SUCH AS "WHERE" |
| N | A SENTENCE IN WHICH A DECLARATION SENTENCE IS NEGATED |
| ... | ... |

Fig. 13

810 — TOPIC SPECIFICATION INFORMATION (="SATO")
UPPER CONCEPT TOPIC SPECIFICATION INFORMATION (="AMATEUR BASEBALL")
LOWER CONCEPT TOPIC SPECIFICATION INFORMATION (="HOME RUN")
SYNONYM (="PANDA SATO", "THE PLAYER SATO", "PANDA")

| 820 | | | 830 CONTENTS | 840 NEXT PLAN PRESCRIPTION INFORMATION |
|---|---|---|---|---|
| TOPIC TITLE 1-1 (SATO ; * ; LIKE) | ANSWER SENTENCE 1-1 | ANSWER TYPE | | |
| | | DA | "I LIKE SATO TOO" | ID 「000010」 |
| | | TA | "I LIKE SATO WHEN HE IS IN THE BATTER BOX" | ID 「000011」 |
| | | ... | ... | ... |
| | ANSWER SENTENCE 1-2 | ... | ... | ... |
| TOPIC TITLE 1-2 | ... | | | |
| ... | | | | |

CONVERSATION CONTROL APPARATUS

RELATED APPLICATION

This application claims the priority of Japanese Patent Application No. 2005-307864 filed on Oct. 21, 2005, which is incorporated herein by reference.

BACKGROUND OF THE INVENTION

1. Field of the Invention

The present invention relates to a conversation control apparatus which transmits an answer or a response in accordance with an utterance from a user.

2. Related Art

At present, a large number of conversation control apparatuses have been proposed, and their practical application is being attempted. In general, this kind of conversation control apparatus is such that the conversation control apparatus only asks a question, or only receives a question from a user, and has lacked flexibility with regard to conversation contents.

A conversation control apparatus to date, when attempting to carry out an acquisition of a survey, in the event that the user vocalizes an utterance unrelated to the survey, has been unable to make an appropriate response to the utterance contents, so it has been difficult to achieve the aim of acquiring the survey. As a reason for this, a problem has existed in that, in the event that the user makes an utterance of contents unrelated to the survey acquisition, as the conversation control apparatus can only repeat a response of "Please say that again", a dialog with the user finishes without achieving the acquisition of the survey.

SUMMARY OF THE INVENTION

An aim of the invention is to provide a conversation control apparatus capable of returning a predetermined answer, in a predetermined order, even in the event that user utterance contents differ from an original objective.

As a means of solving the problem described heretofore, the invention includes the features described hereafter.

The invention is proposed as a conversation control apparatus which transmits an answer sentence in response to a user utterance.

The conversation control apparatus includes: a processor (for example, a CPU) causing an execution of a control which transmits an answer sentence in response to a user utterance; and a memory (for example, a conversation data base) storing a plurality of plans each including the answer sentence and next candidate prescription information (for example, next plan prescription information) which prescribes a next candidate answer sentence, which is an answer sentence due to be transmitted in an order succeeding the answer sentence. The processor: in response to a first user utterance, selects a plan stored in the memory, causes the selected plan to transmit an answer sentence included in the plan and, subsequently, in response to a second user utterance, based on next candidate prescription information included in the plan, causes a transmission of a next candidate answer sentence; and, regardless of contents of a user utterance, causes a transmission of a predetermined answer sentence (for example, each question in a survey) and next candidate answer sentence in a predetermined order to at least one portion of the plurality of plans.

According to such a conversation control apparatus, it is possible to transmit a predetermined answer sentence (for example, a survey question item) in a predetermined order.

It is also acceptable that the conversation control apparatus further has the following feature. That is, the conversation control apparatus is established even with the feature that the one portion of the plurality of plans being N plans storing answer sentences from a first to an $N^{th}$ which are transmitted in order, the $M^{th}$ plan from among the N plans includes next candidate prescription information prescribing a first answer sentence after the $M^{th}$.

According to such a conversation control apparatus, it is possible to transmit a first to an $N^{th}$ answer sentence in an order of the first to the $N^{th}$, regardless of the contents of the user utterance.

It is also acceptable that the conversation control apparatus further has the following feature. That is, the conversation apparatus is established even with the feature that the at least one portion of the plurality of plans, even in the event that contents of a user utterance responding to a transmitted question are other than predetermined answer contents, is a plan for repeatedly transmitting the question.

According to such a conversation control apparatus, it is possible to provide a conversation control apparatus capable of acquiring an answer regarding a predetermined matter, in a predetermined order, even in the event that the user utterance contents differ from an original objective.

According to the invention, it is possible to return a predetermined answer, in a predetermined order, even in the event that user utterance contents differ from an original objective.

Additional objects and advantage of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE INVENTION OF THE DRAWINGS

The accompanying drawings, which are incorporated in and constitute a part of the specification, illustrate embodiments of the invention, and together with the general description given above and the detailed description of the embodiments given below, serve to explain the principals of the invention.

FIG. 7 is a diagram showing a "Type of Utterance", two letters of the alphabet representing the type of utterance, and an example of an utterance pertaining to the type of utterance;

FIG. 8 shows a relationship between a type of sentence and a dictionary for determining the type;

FIG. 11 is a diagram showing a data configuration example of a topic title (also called "a second morpheme information");

FIG. 12 is a diagram for describing a data configuration example of an answer sentence;

FIG. 13 shows a specific example of a topic title, answer sentence and next plan prescription information correlated to the certain item of topic specification information;

Figure 17:
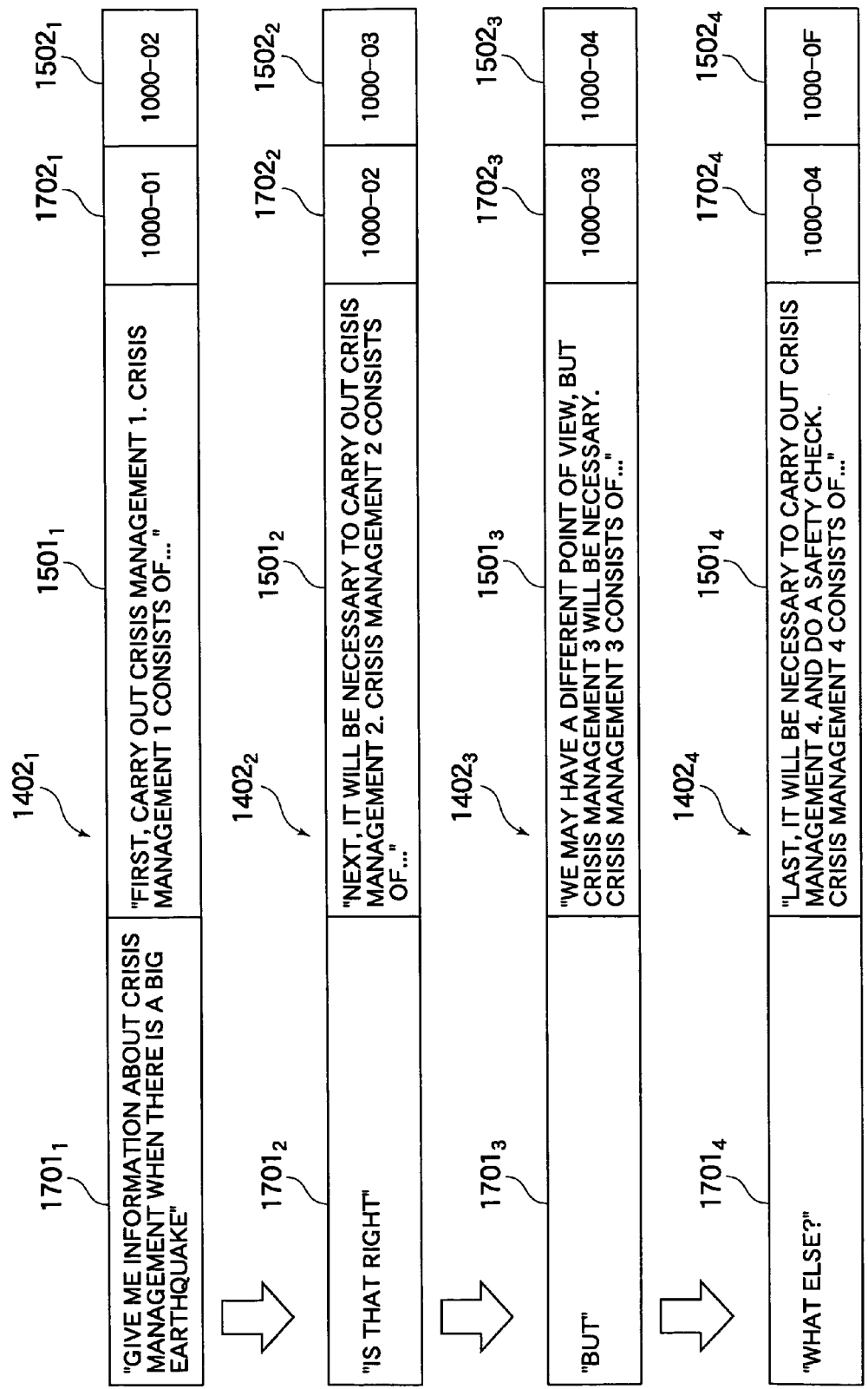
Figure 18:
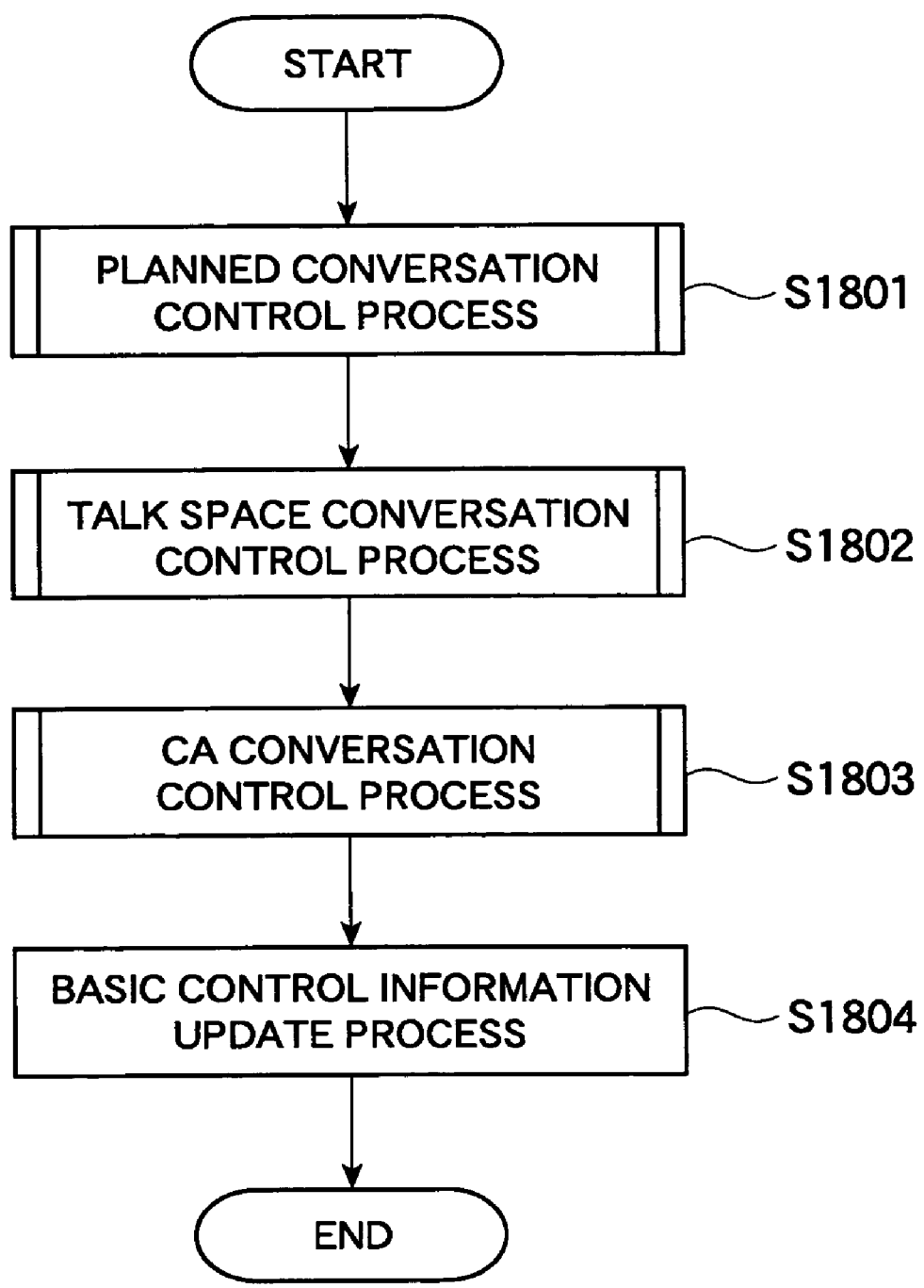
Figure 19:
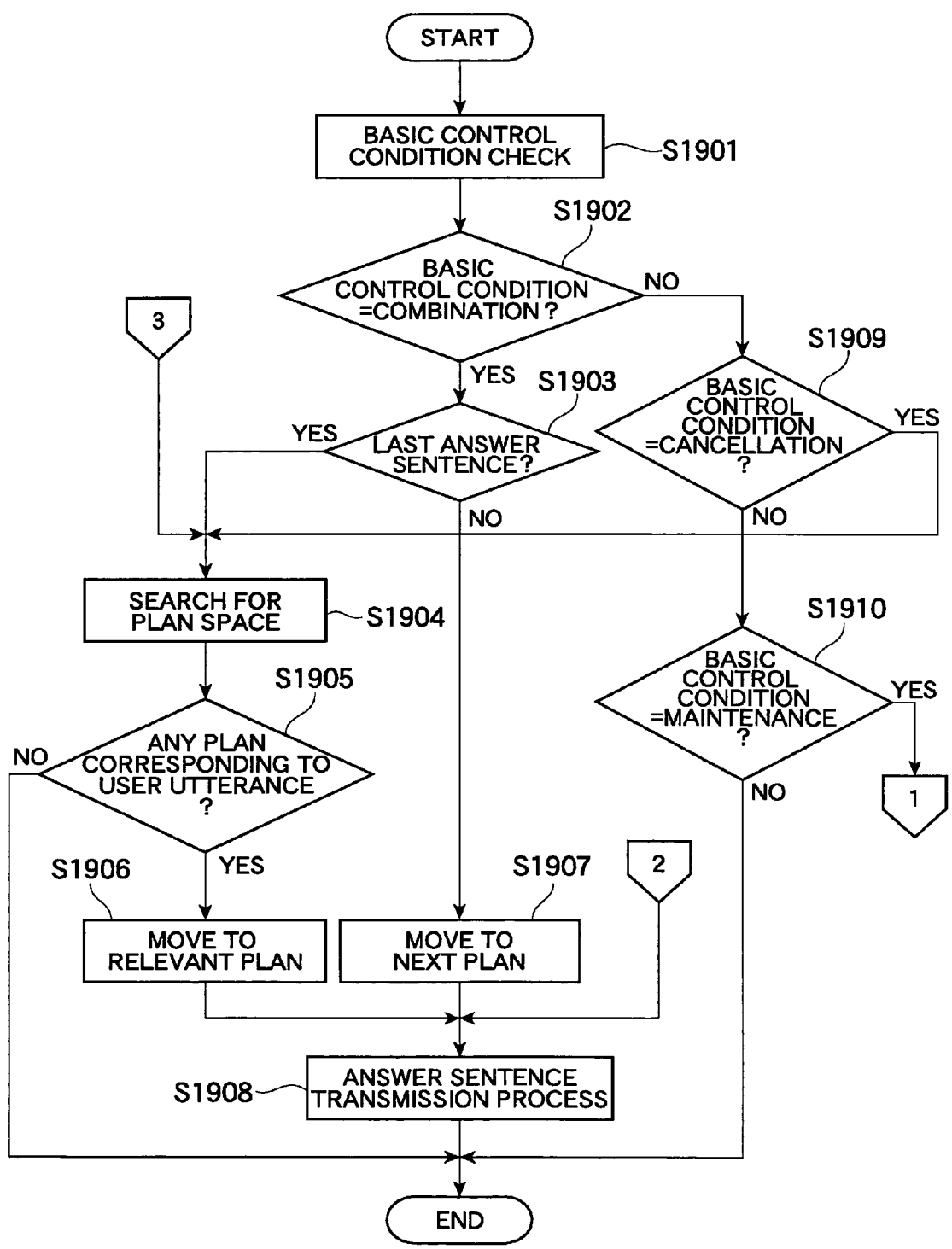
Figure 20:
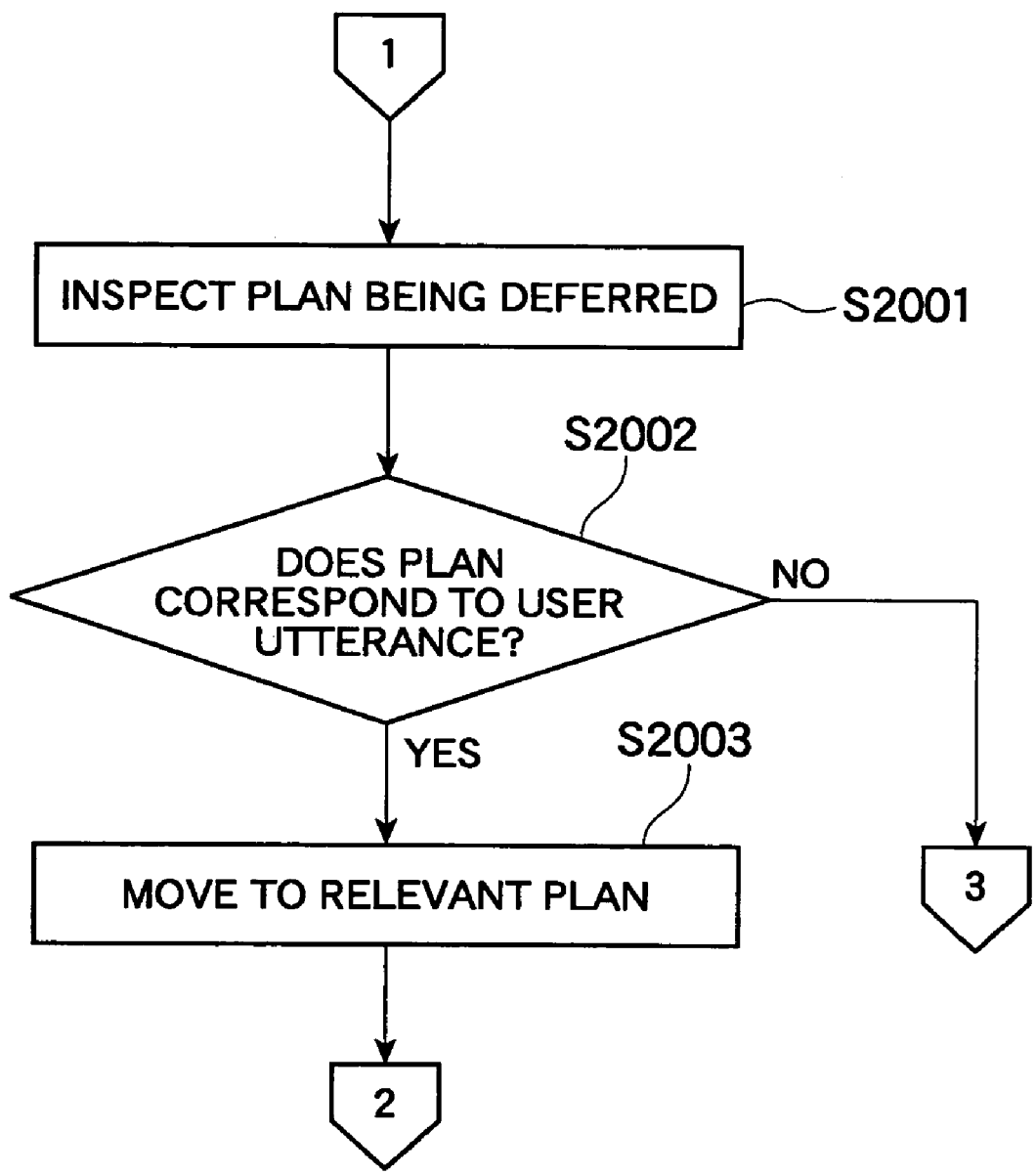
Figure 21:
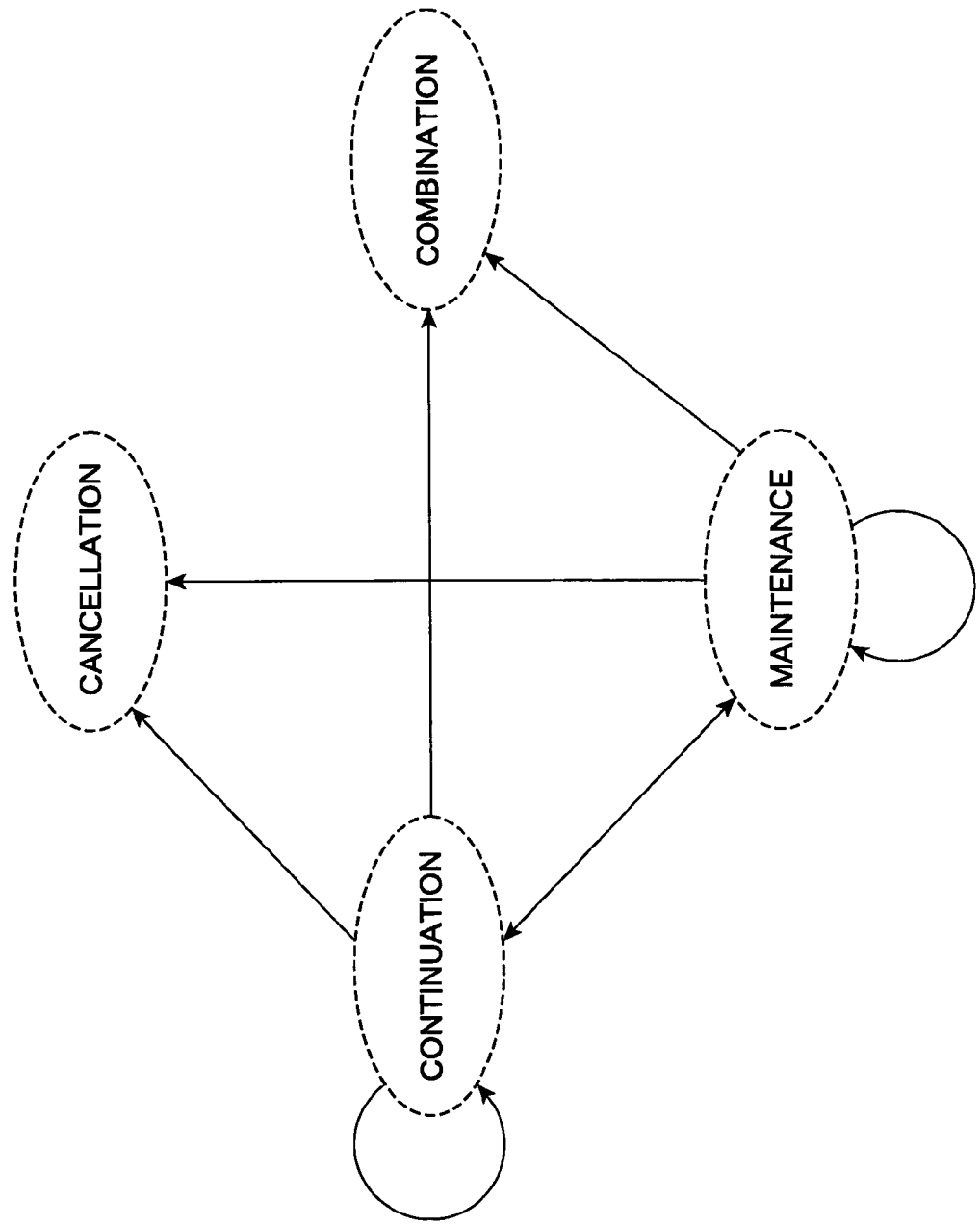
Figure 22:
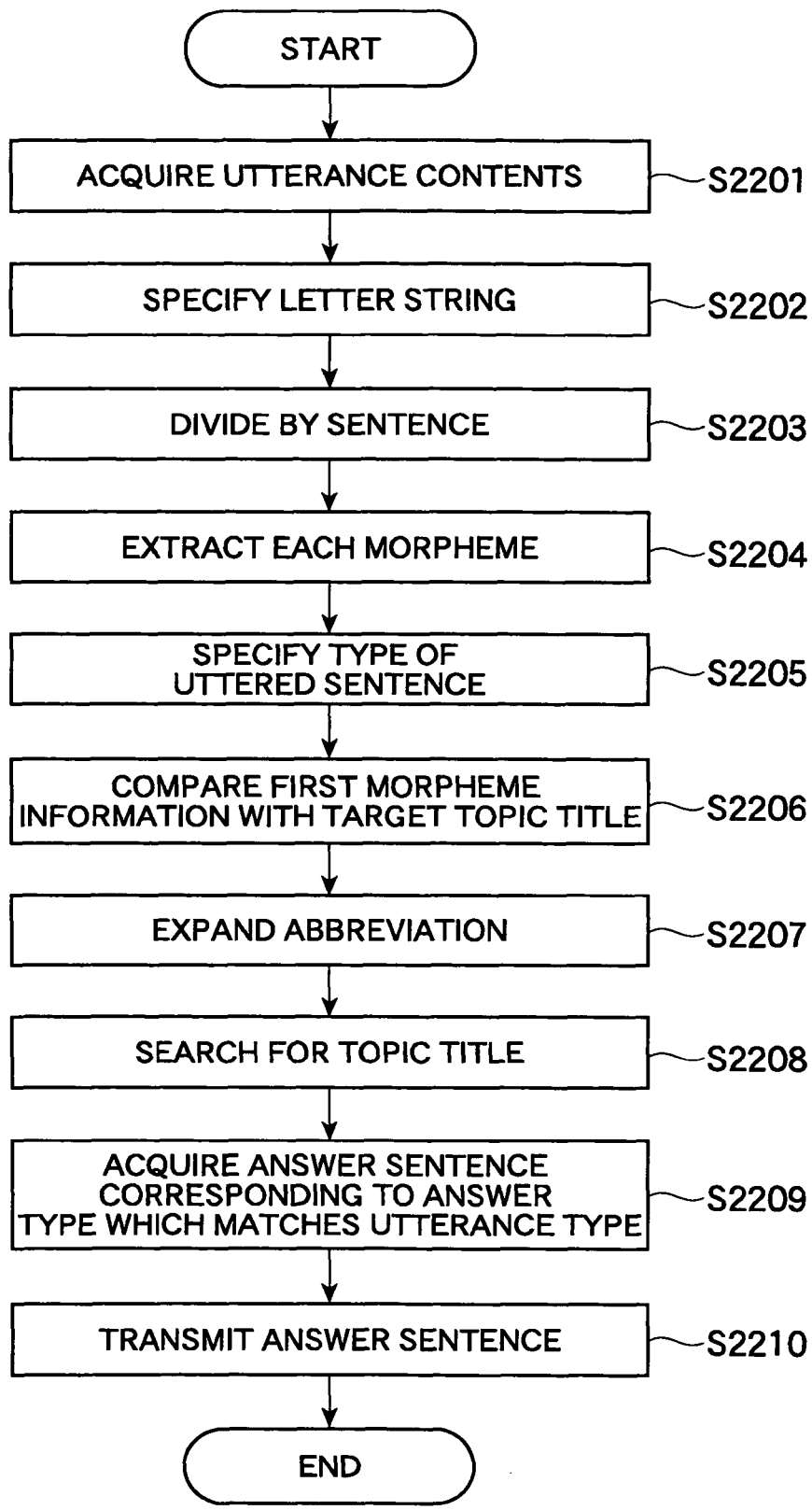
Figure 23:
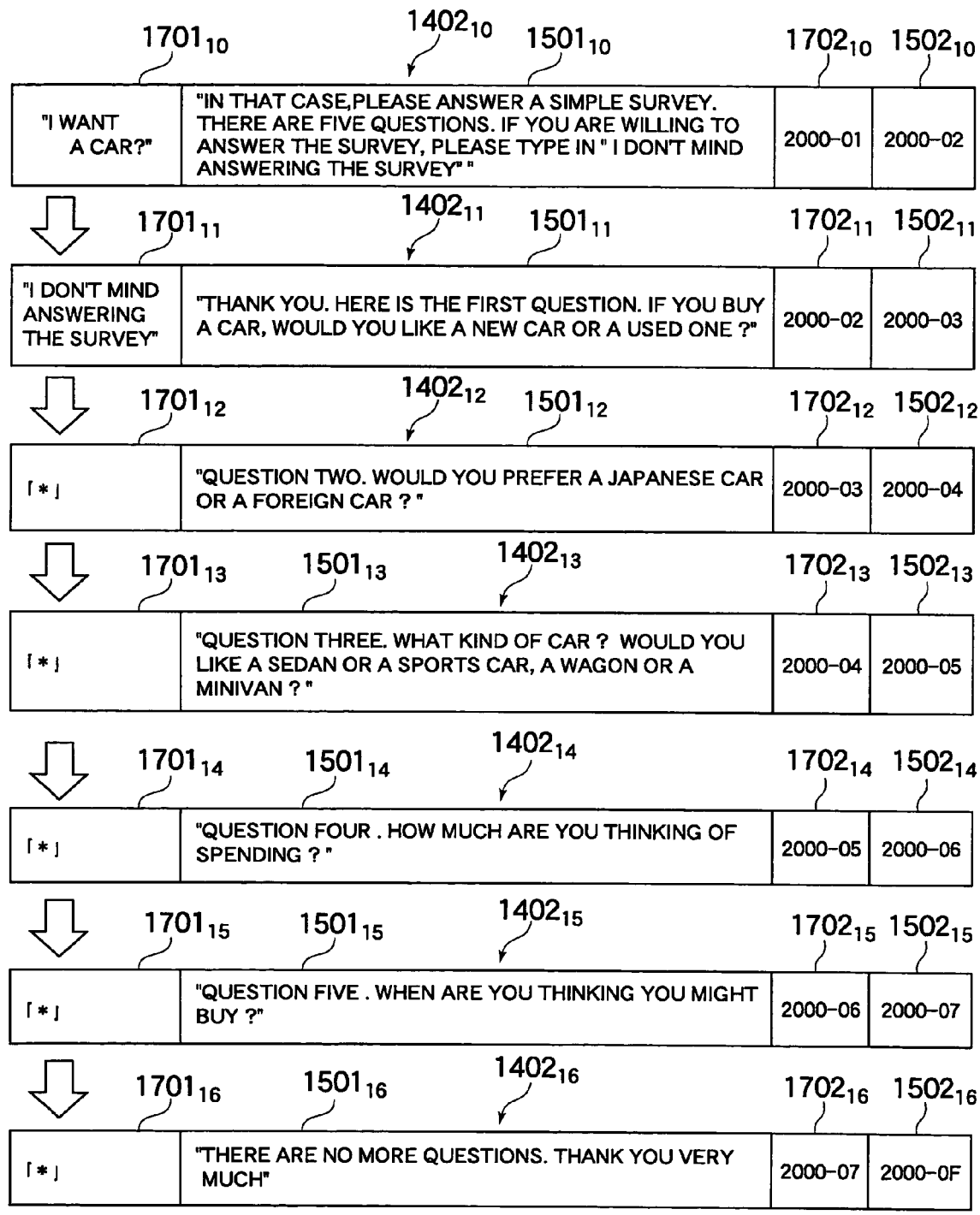
Figure 24:
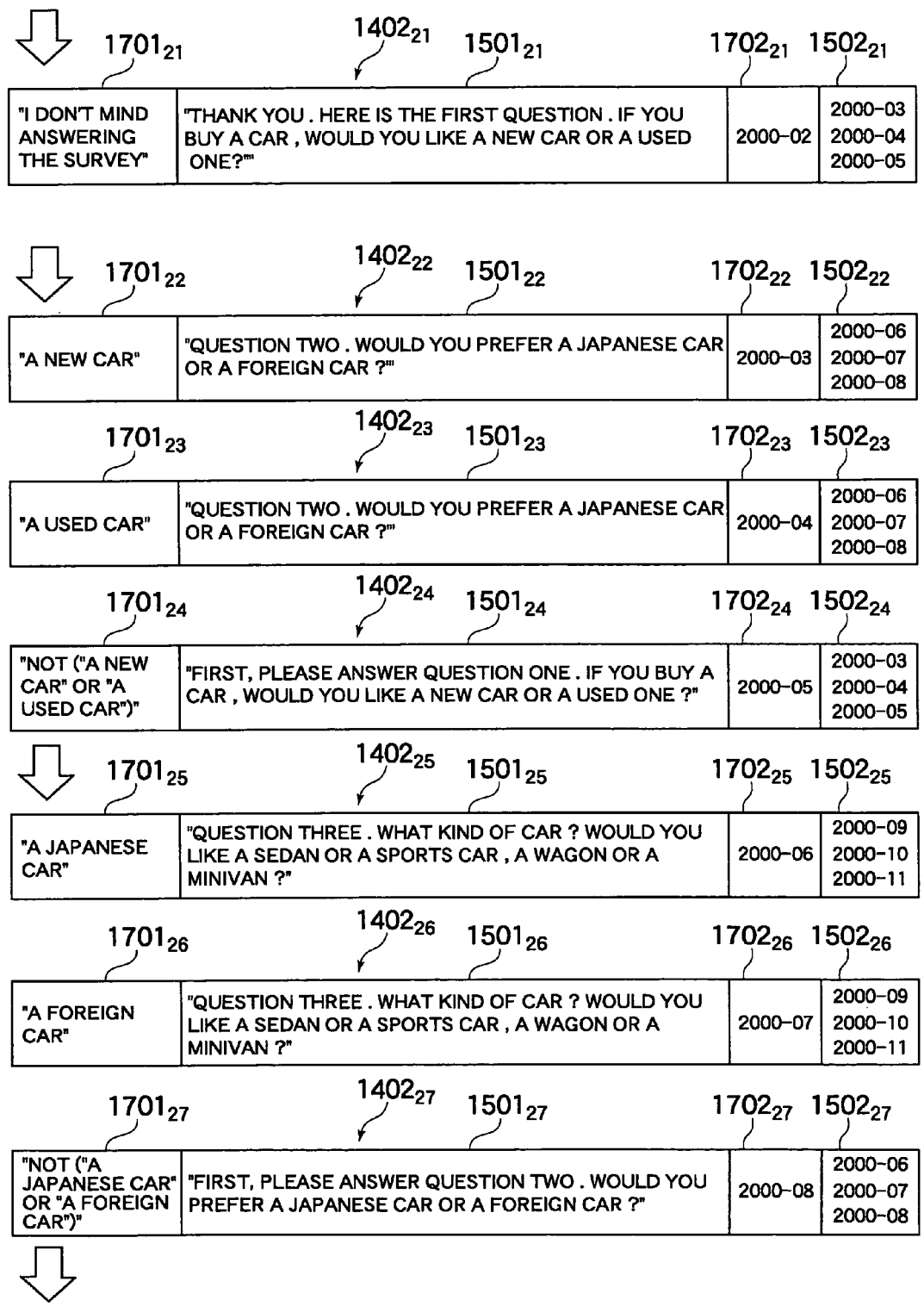

FIG. 17 a diagram showing a specific example of a planned conversation process;

FIG. 18 is a flowchart showing an example of a main process of a conversation controller;

FIG. 19 is a flowchart showing an example of the planned conversation control process;

FIG. 20 is a flowchart showing an example of the planned conversation control process, continuing from FIG. 19;

FIG. 21 is a diagram showing a basic control condition;

FIG. 22 is a flowchart showing an example of a talk space conversation control process;

FIG. 23 is a diagram showing a specific example of a planned conversation process in a second embodiment; and FIG. 24 is a diagram showing another specific example of the planned conversation process in the second embodiment.

DESCRIPTION OF THE PREFERRED EMBODIMENTS

Hereafter, a description will be given of a first embodiment of the invention, while referring to the drawings.

The first embodiment of the invention is proposed as a conversation control apparatus which outputs a response to a user utterance, and establishes a conversation with the user.

A. First Embodiment

1. Configuration Example of a Conversation Control Apparatus 1.1. Overall Configuration FIG. 1 is a functional block diagram showing a configuration example of a conversation control apparatus 1 according to the embodiment.

The conversation control apparatus 1 has for example, an information processor such as a computer or a work station, or hardware equivalent to the information processor, loaded inside its housing. The information processor included in the conversation control apparatus 1 is configured by a device equipped with a central processing unit (CPU), a main memory (RAM), a read only memory (ROM), an input/output device (I/O), and an external memory device such as a hard disc. A program for causing the information processor to function as the conversation control apparatus 1, or a program for causing a computer to execute a conversation control method, being stored in the ROM, the external memory device or the like, a relevant program is loaded into the main memory, and the conversation control apparatus 1 or the conversation processing method is realized by the CPU executing the program. Also, it is not essential that the program is stored in a memory device inside the relevant apparatus, as it is also acceptable that a configuration is such that it is provided by a computer readable program recording medium such as a magnetic disc, an optical disc, a magneto optical disc, a CD (Compact Disc) or a DVD (Digital Video Disc), or an external device (for example, an ASP (Application Service Provider) server etc.), and loaded in the main memory.

Figure 1:
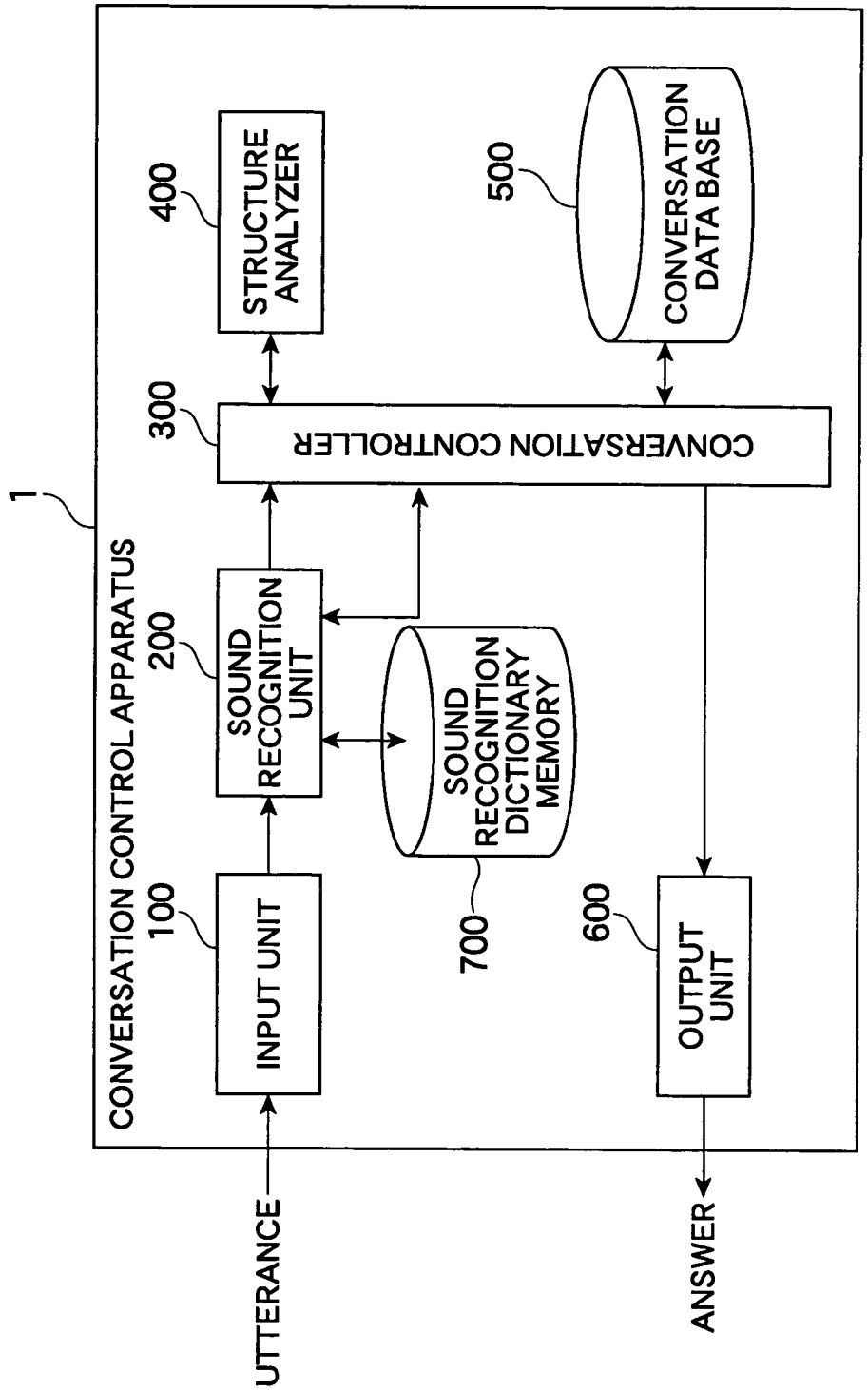
FIG. 1 is a functional block diagram showing a configuration example of a conversation control apparatus.

As shown in FIG. 1, the conversation control apparatus 1 includes an input unit 100, a sound recognition unit 200, a conversation controller 300, a structure analyzer 400, a conversation data base 500, an output unit 600 and a sound recognition dictionary memory 700.

1.1.1. Input Unit

The input unit 100 acquires input information (a user utterance) input by a user. The input unit 100 transmits sound corresponding to the acquired utterance contents as a sound signal to the sound recognition unit 200. It is not essential that the input unit 100 is limited to one which handles sound, as it is also acceptable that it is one such as a keyboard or a touch sensitive screen which handles a letter input. In this case, it is not necessary to provide the sound recognition unit 200, to be described hereafter.

1.1.2. Sound Recognition Unit

The sound recognition unit 200, based on the utterance contents acquired by the input unit 100, identifies a letter string corresponding to the utterance contents. Specifically, the sound recognition unit 200, into which the sound signal from the input unit 100 is input, based on the input sound signal, cross references the sound signal with a dictionary stored in the sound recognition dictionary memory 700 and the conversation data base 500, and transmits a sound recognition result inferred from the sound signal. Although, in the configuration example shown in FIG. 1, the sound recognition unit 200 requests the conversation controller 300 to acquire memory details from the conversation data base 500, and receives the memory details from the conversation data base 500 which the conversation controller 300 has acquired in response to the request, it is also acceptable to configure in such a way that the sound recognition unit 200 directly acquires the memory details from the conversation data base 500, and carries out a comparison with the sound signal.

1.1.2.1. Configuration Example of the Sound Recognition Unit

Figure 2:
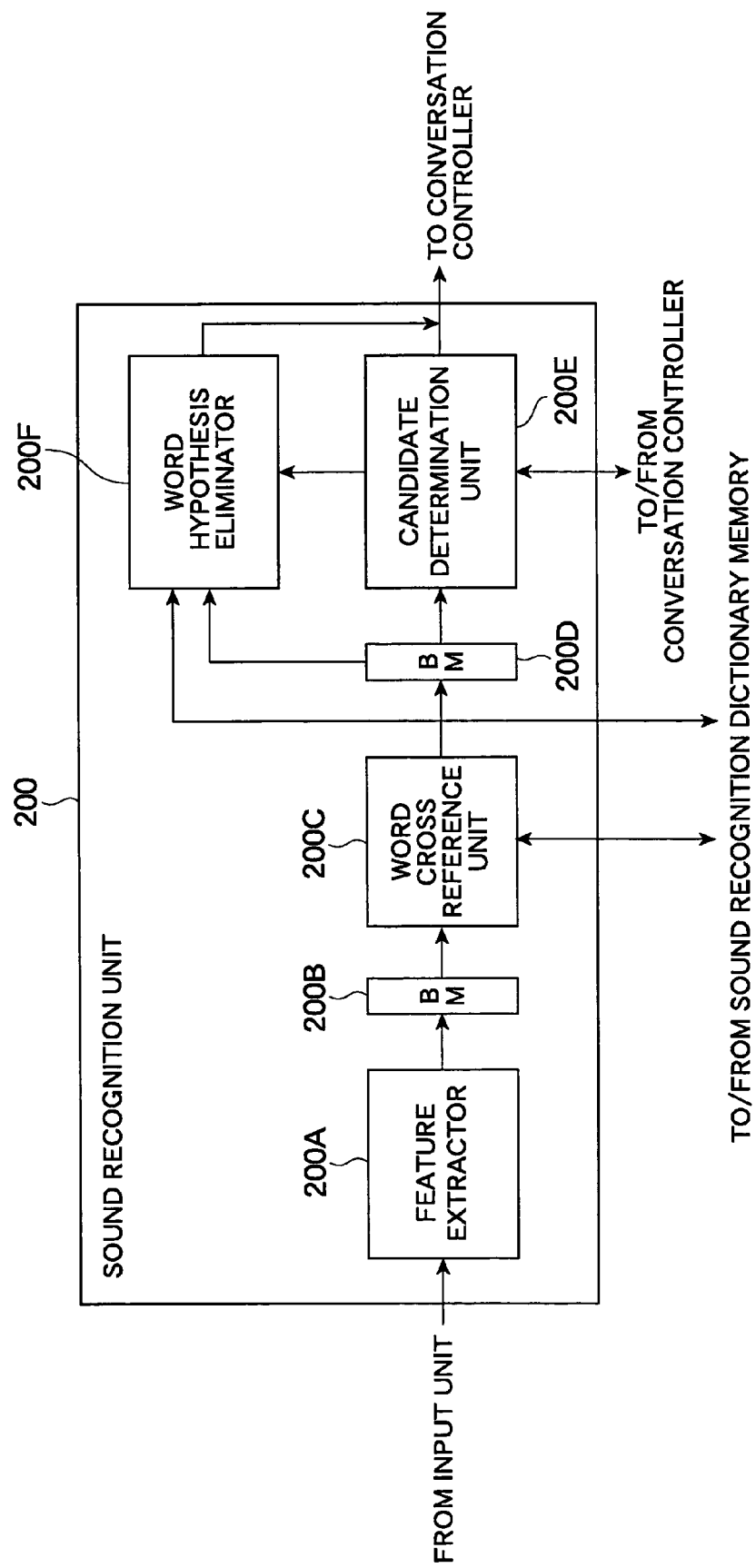
FIG. 2 is a functional block diagram showing a configuration example of a sound recognition unit.

FIG. 2 shows a functional block diagram showing a configuration example of the sound recognition unit 200. The sound recognition unit 200 includes a feature extractor 200A, a buffer memory (BM) 200B, a word cross reference unit 200C, a buffer memory (BM) 200D, a candidate determining unit 200E, and a word hypothesis eliminator 200F. The word cross reference unit 200C and the word hypothesis eliminator 200F are connected to the sound recognition dictionary memory 700, while the candidate determining unit 200E is connected to the conversation data base 500.

The sound recognition dictionary memory 700 connected to the word cross reference unit 200C stores a phoneme hidden Markov model (hereafter, the hidden Markov model will be referred to as HMM). The phoneme HMM being expressed inclusive of each condition, each condition includes the following information. It is configured of (a) a condition number, (b) a receivable context class, (c) a list of preceding conditions and following conditions, (d) output probability density distribution parameters, and (e) a self-transition probability and a probability of transition to a following condition. The phoneme HMM used in the embodiment, as it is necessary to identify in which speaker each distribution originates, converts and generates a prescribed speaker mixture HMM. Herein, an output probability density function is a mixture Gaussian distribution having a 34 dimensional diagonal covariance matrix. Also, the sound recognition dictionary memory 700 connected to the word cross reference unit 200C stores a word dictionary. The word dictionary stores a symbol string indicating a reading expressed by a symbol for each word of the phoneme HMM.

After a speaker's vocalized sound is input into a microphone or the like and converted into a sound signal, it is input into the feature extractor 200A. The feature extractor 200A, after A/D converting the input sound signal, extracts feature parameters and transmits them. Although a variety of methods for extracting the feature parameters and transmitting them can be considered, as one example, a method is proposed in which an LPC analysis is carried out, and a 34 dimensional feature parameter, including a logarithmic power, a $16^{th}$ order cepstrum coefficient, a Δ logarithmic power and a $16^{th}$ order Δ cepstrum coefficient, is extracted. A time series of the extracted feature parameter is input in the word cross reference unit 200C via the buffer memory (BM) 200B.

The word cross reference unit 200C, using a one pass Viterbi decoding method, based on data of the feature parameter input via the buffer memory 200B, detects word hypotheses using the phoneme HMM and word dictionary stored in the sound recognition dictionary memory 700, calculates a likelihood and transmits it. Herein, the word cross reference unit 200C calculates a likelihood in a word and a likelihood from a start of a vocalization for every condition of each HMM at each time. Individual words have the likelihood for each difference in an identification number of a word which is a calculation subject of the likelihood, a vocalization starting time of the word, and a preceding word vocalized prior to the word. Also, in order to reduce an amount of a calculation process, it is also acceptable to reduce a low likelihood grid hypothesis from an overall likelihood calculated based on the phoneme HMM and word dictionary. The word cross reference unit 200C transmits the detected word hypotheses and information on the likelihood, along with time information (specifically, for example, a frame number) from the vocalization starting time, via the buffer memory 200D to the candidate determining unit 200E, and the word hypothesis eliminator 200F.

The candidate determining unit 200E, with reference to the conversation controller 300, compares the detected word hypotheses and topic specification information in a prescribed talk space, determines whether or not any among the detected word hypotheses matches the topic specification information in the prescribed talk space and, in the event that there is a match, transmits the matching word hypothesis as the recognition result while, in the event that there is no match, it requests the word hypothesis eliminator 200F to carry out an elimination of the word hypothesis.

A description will be given of an operation example of the candidate determining unit 200E. Now, it is assumed that the word cross reference unit 200C transmits a plurality of word hypotheses "kantaku", "kataku", "kantoku" and a likelihood (recognition rate) thereof, in which case, the prescribed talk space being related to "movies", "kantoku (director)" is included in the topic specification information, but "kantaku (reclaim)" and "kataku (pretext)" are not included. Also, of "kantaku", "kataku" and "kantoku", the likelihood (recognition rate) of "kantaku" is the highest and of "kantoku" the lowest, with "kataku" between the two.

In the situation described heretofore, the candidate determining unit 200E compares the detected word hypotheses and the topic specification information in the prescribed talk space, determines that the word hypothesis "kantoku" matches the topic specification information in the prescribed talk space, transmits the word hypothesis "kantoku" as the recognition result, and transfers it to the conversation controller 300. By processing in this way, the word hypothesis "kantoku (director)" related to the topic "movies" presently being handled is selected in preference to the word hypotheses "kantaku" and "kataku", which have a higher likelihood (recognition rate), as a result of which it is possible to transmit a sound recognition result conforming with a context of a conversation.

Meanwhile, in the event that there is no match, the word hypothesis eliminator 200F operates in such a way as to transmit a recognition result in response to the request from the candidate determining unit 200E to carry out the elimination of the word hypothesis. The word hypothesis eliminator 200F, based on a plurality of word hypotheses transmitted from the word cross reference unit 200C via the buffer memory 200D, with reference to a statistical linguistic model stored in the sound recognition dictionary memory 700, after carrying out an elimination of word hypotheses of identical words having equivalent finishing times but different starting times, in order to use as a representative one word hypothesis which has the highest likelihood from the overall likelihood calculated from the vocalization starting time to the relevant word finishing time, for each leading phoneme environment of the words, transmits a word string of a hypothesis having the greatest overall likelihood, from among word strings of all the word hypotheses after elimination, as the recognition result. In the embodiment, it is preferable that the leading phoneme environment of the word to be processed refers to a three phoneme alignment including the last phoneme of the word hypothesis preceding the word and the first two phonemes of the word's word hypothesis.

Figure 3:
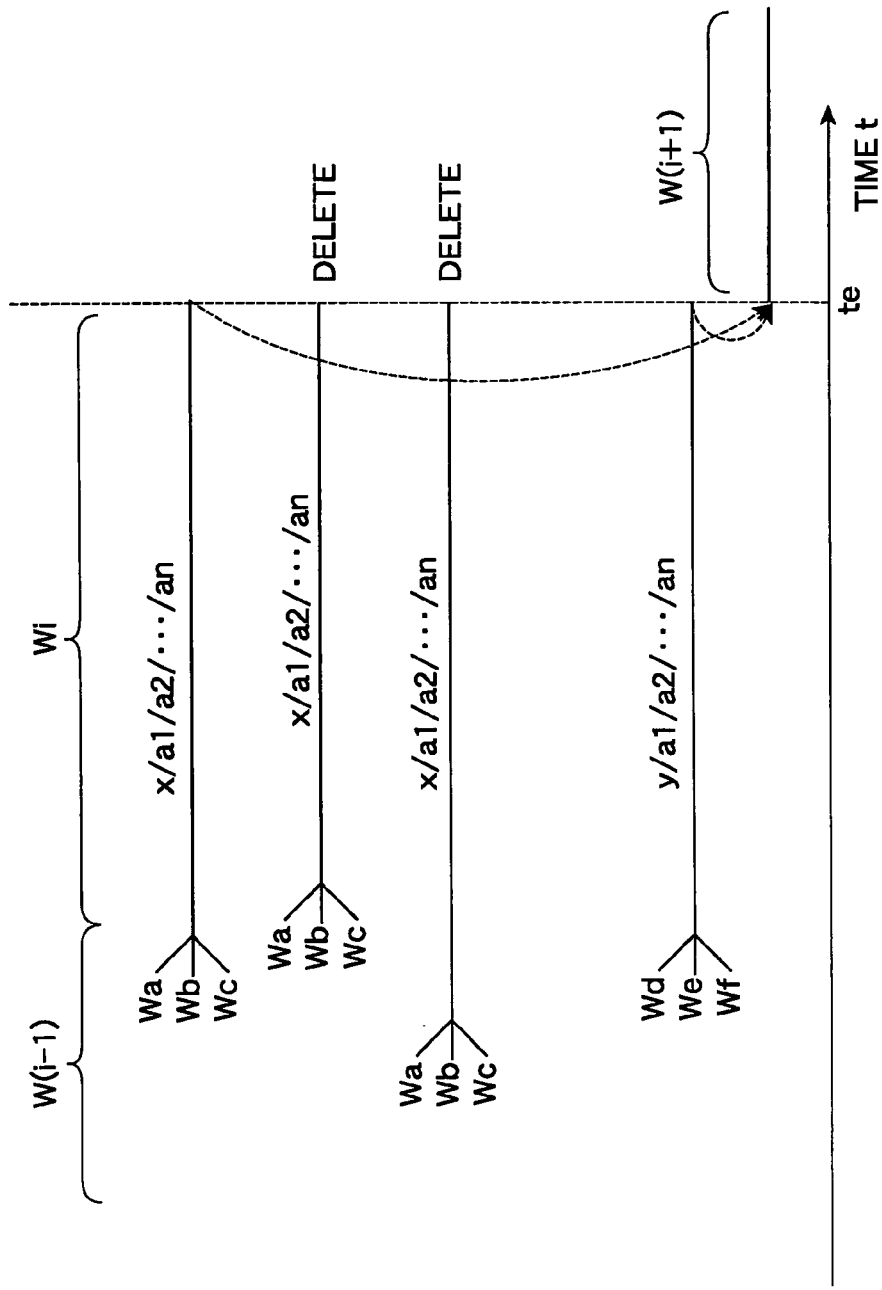
FIG. 3 is a timing chart showing an example of a process of a word hypothesis eliminator.

A description will be given, while referring to FIG. 3, of an example of a word elimination process by the word hypothesis eliminator 200F. FIG. 3 is a timing chart showing an example of a process of the word hypothesis eliminator 200F.

For example, when an $i^{th}$ word Wi comprising a phoneme string a1, a2, . . . , an comes after a $(i-1)^{th}$ word Wi-1, it is taken that six hypotheses Wa, Wb, Wc, Wd, We and Wf exist as word hypotheses of the word Wi-1. Herein, it is taken that the last phoneme of the former three word hypotheses Wa, Wb and Wc is /x/, and the last phoneme of the latter three word hypotheses Wd, We and Wf is /y/. At a finishing time te, in the event that three hypotheses presupposing the word hypotheses Wa, Wb and Wc and one hypothesis presupposing the word hypotheses Wd, We and Wf remain, a hypothesis having the highest overall likelihood, from among the former three hypotheses with equivalent leading phoneme environments, is retained, while the others are deleted.

As the hypotheses presupposing the word hypotheses Wd, We and Wf have a leading phoneme environment different to that of the other three hypotheses, that is, as the last phoneme of the preceding word hypothesis is not x but y, the hypothesis presupposing the word hypotheses Wd, We and Wf is not deleted. That is, only one hypothesis is retained for each last phoneme of the preceding word hypothesis.

Although, in the embodiment described heretofore, the leading phoneme environment of the word is defined as a three phoneme alignment including the last phoneme of the word hypothesis preceding the word and the first two phonemes of the word's word hypothesis, the invention is not limited to this, it is also acceptable that it is a phoneme alignment including a phoneme string of the preceding word hypothesis, including the last phoneme of the preceding word hypothesis and at least one phoneme of the preceding word hypothesis consecutive with the last phoneme, and a phoneme string including the first phoneme of the word's word hypothesis.

In the embodiment described heretofore, the feature extractor 200A, the word cross reference unit 200C, the candidate determining unit 200E and the word hypothesis eliminator 200F are configured of, for example, a computer such as a microcomputer, while the buffer memories 200B and 200D, and the sound recognition dictionary memory 700, are configured of, for example, a memory device such as a hard disc memory.

Although, in the embodiment described heretofore, the sound recognition is carried out using the word cross reference unit 200C and the word hypothesis eliminator 200F, the invention is not limited to this, as it is also acceptable to configure as, for example, a phoneme cross reference unit which has reference to a phoneme HMM and, for example, a sound recognition unit which carries out a sound recognition of a word with reference to a statistical linguistic model using a one pass DP algorithm.

Also, in the embodiment, the sound recognition unit 200 is described as a portion of the conversation control apparatus 1, but it is also possible that it is an independent sound recognition device including the sound recognition unit 200, the sound recognition dictionary memory 700 and the conversation data base 500.

1.1.2.2. Operating Example of the Sound Recognition Unit

Figure 4:
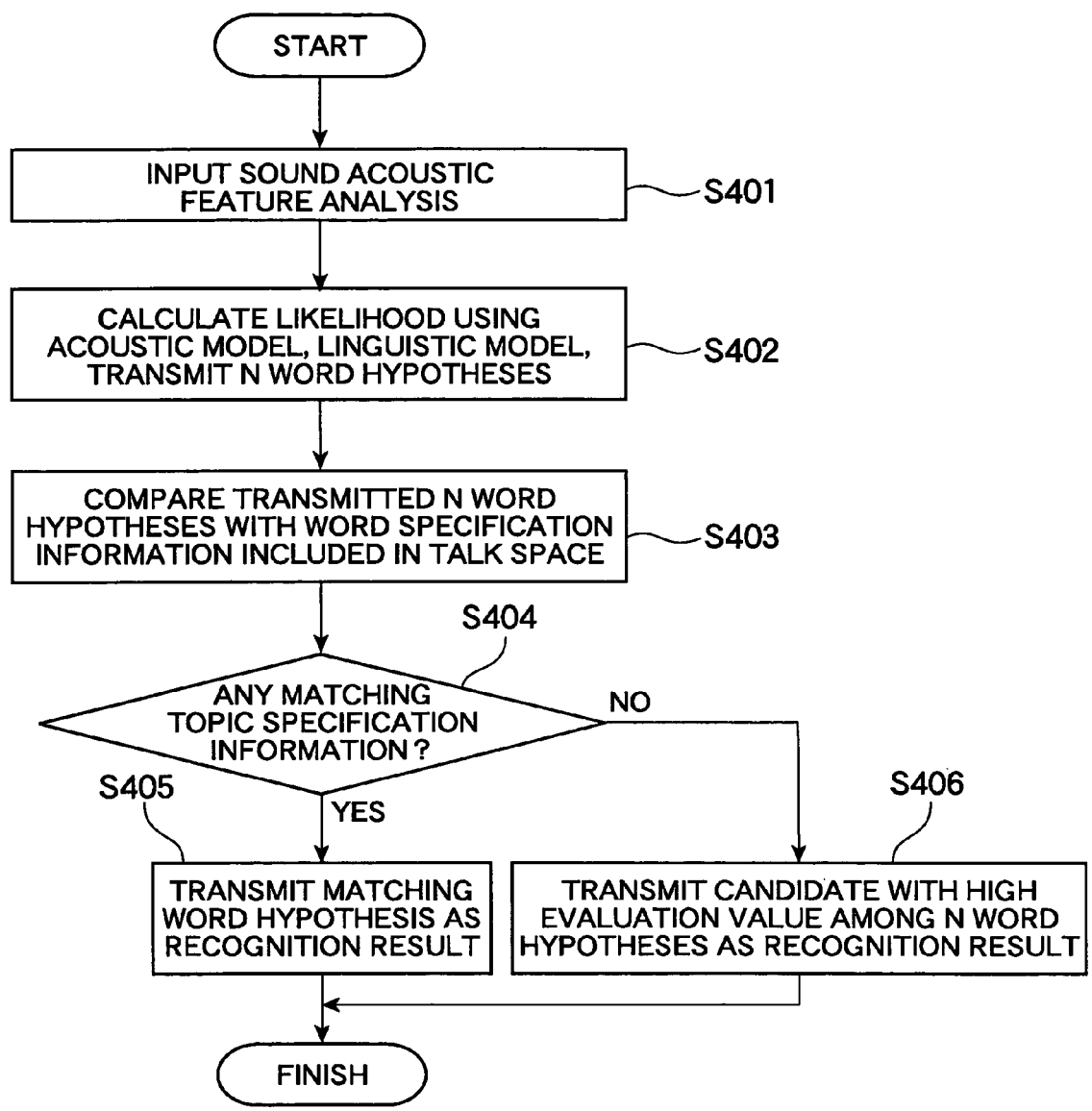
FIG. 4 is a flowchart showing an operation example of the sound recognition unit.

Next, a description will be given of an operation of the sound recognition unit 200 while referring to FIG. 4. FIG. 4 is a flowchart showing an operation example of the sound recognition unit 200. On receiving a sound signal from the input unit 100, the sound recognition unit 200 carries out a feature analysis of the received sound, and generates feature parameters (step S401). Next, it compares the feature parameters with the phoneme HMM and linguistic model stored in the sound recognition dictionary memory 700, and acquires a prescribed number of word hypotheses and a likelihood thereof (step S402). Next, the sound recognition unit 200 compares the acquired prescribed number of word hypotheses, the detected word hypotheses and topic specification information in the prescribed talk space, and determines whether or not any among the detected word hypotheses matches the topic specification information in the prescribed talk space (step S403, S404). In the event that there is a match, the sound recognition unit 200 transmits the matching word hypothesis as the recognition result (step S405). Meanwhile, in the event that there is no match, the sound recognition unit 200, in accordance with the likelihood of the acquired word hypotheses, transmits the word hypothesis with the greatest likelihood as the recognition result (step S406).

1.1.3. Sound Recognition Dictionary Memory

Returning to FIG. 1, the description of the configuration example of the conversation control apparatus 1 will be continued.

The sound recognition dictionary memory 700 stores a letter string corresponding to a standard sound signal. The sound recognition unit 200 which has cross referenced specifies a letter string corresponding to a word hypothesis which corresponds to the sound signal, and transmits the specified letter string to the conversation controller 300 as a letter string signal.

1.1.4. Structure Analyzer

Figure 5:
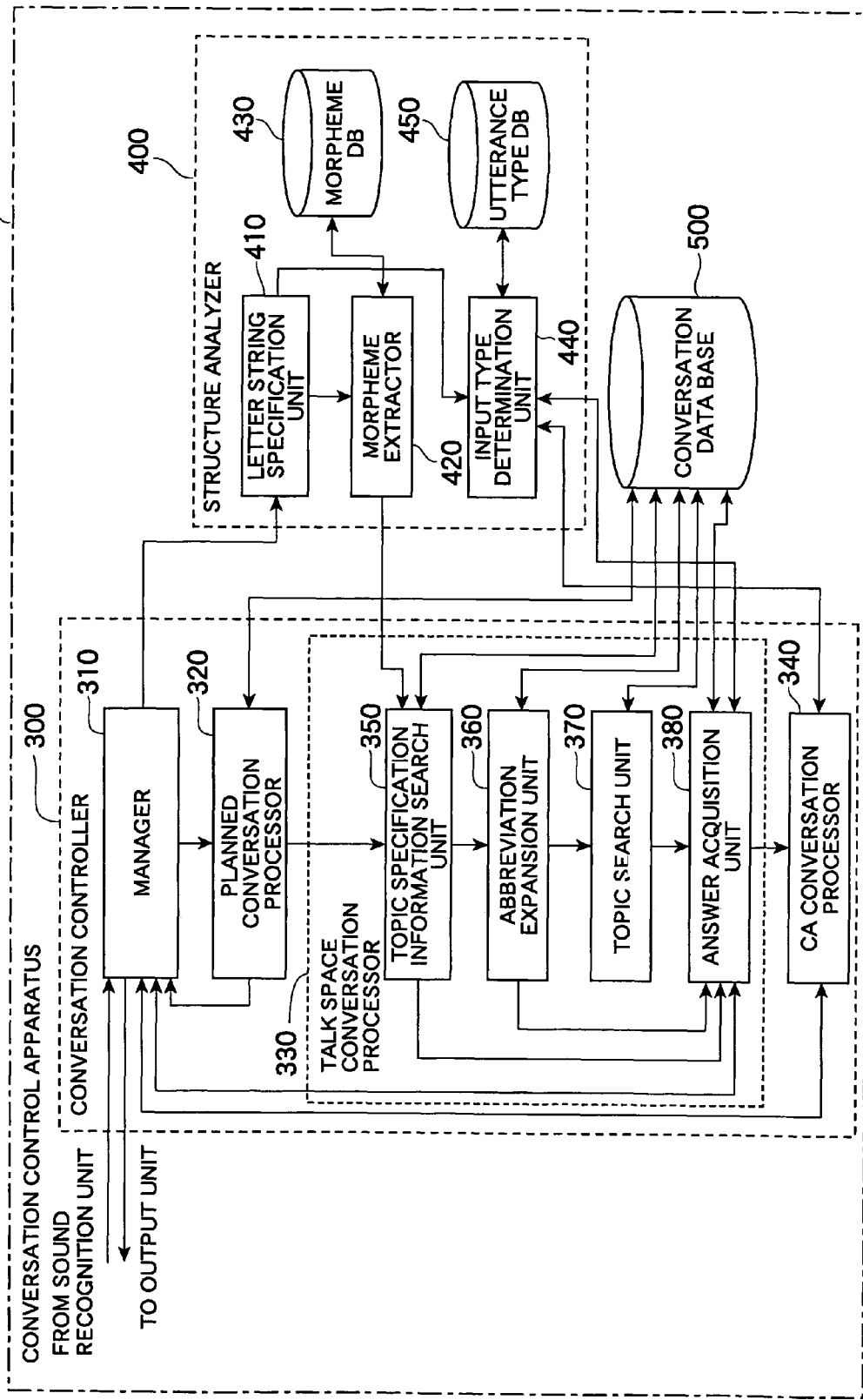
FIG. 5 is a partially enlarged block diagram of the conversation control apparatus.

Next, a description will be given of a configuration example of the structure analyzer 400 while referring to FIG. 5. FIG. 5, being a partial enlarged block diagram of the conversation control apparatus 1, is a block diagram showing a specific configuration example of the conversation controller 300 and the structure analyzer 400. FIG. 5 shows only the conversation controller 300, the structure analyzer 400 and the conversation data base 500, and other components are omitted.

The structure analyzer 400 analyzes a letter string specified by the input unit 100 or the sound recognition unit 200. In the embodiment, as shown in FIG. 5, the structure analyzer 400 includes a letter string specification unit 410, a morpheme extractor 420, a morpheme data base 430, an input type determination unit 440 and an utterance type data base 450. The letter string specification unit 410 divides a series of letter strings specified by the input unit 100 and the sound recognition unit 200 into individual clauses. The individual clause refers to a sentence segment obtained by dividing the letter strings as small as possible without destroying a grammatical meaning. Specifically, the letter string specification unit 410, when there is a time interval of a certain length or more in the series of letter strings, divides the letter string at that portion. The letter string specification unit 410 transmits each divided letter string to the morpheme extractor 420 and the input type determination unit 440. A "letter string" described hereafter refers to a letter string for an individual clause.

1.1.4.1. Morpheme Extractor

The morpheme extractor 420, based on a letter string of an individual clause divided by the letter string specification unit 410, extracts each morpheme configuring a minimum unit of the letter string, from the letter string of the individual clause, as first morpheme information. Herein, in the embodiment, the morpheme refers to the minimum unit of a word configuration expressed in the letter string. A part of speech such as, for example, a noun, an adjective or a verb, can be considered as the minimum unit of the word configuration.

Figure 6:
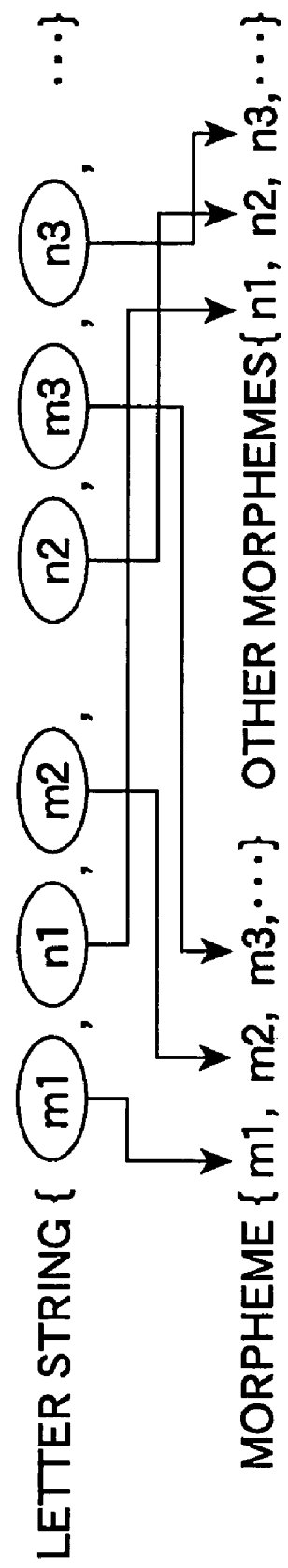
FIG. 6 is a diagram showing a relationship between a letter string and a morpheme extracted from the letter string.

In the embodiment, as shown in FIG. 6, each morpheme can be expressed as m1, m2, m3 . . . . FIG. 6 is a diagram showing a relationship between a letter string and a morpheme extracted from the letter string. As shown in FIG. 6, the morpheme extractor 420, into which the letter string is input from the letter string specification unit 410, cross references the input letter string and a morpheme collection stored in advance in the morpheme data base 430 (the morpheme collection is prepared as a morpheme collection describing a morpheme headword, reading, part of speech, conjugation and the like for each morpheme belonging to each part of speech category). The morpheme extractor 420 which has carried out the cross referencing extracts, from the letter string, each morpheme (m1, m2 . . . ) which matches any one of the morpheme collections stored in advance. An element other than the extracted morphemes (n1, n2, n3 . . . ) may be, for example, an auxiliary verb or the like.

The morpheme extractor 420 transmits the extracted morphemes as the first morpheme information to a topic specification information search unit 350. It is not necessary that the first morpheme information is structured. Herein, "structured" refers to a categorizing and distributing of the morphemes included in the letter string based on the part of speech etc., for example, a converting of a letter string, which is, for example, an uttered sentence, to data obtained by distributing the morphemes, in a prescribed order, such as "subject+object+predicate". Of course, even in the event that structured first morpheme information is used, there is no impediment to a realization of the embodiment.

1.1.4.2. Input Type Determination Unit 440

The input type determination unit 440 determines a type of utterance contents (utterance type) based on the letter string specified by the letter string specification unit 410. The utterance type, being information which specifies the type of utterance contents, in the embodiment, refers to, for example, the "Type of Utterance" shown in FIG. 7. FIG. 7 is a diagram showing the "Type of Utterance", two letters of the alphabet representing the type of utterance, and an example of an utterance pertaining to the type of utterance.

Herein, the "Type of Utterance", in the embodiment, as shown in FIG. 7, includes a declaration (D), a time (T), a location (L), a negation (N) and the like. A sentence configured by each type is configured as an affirmative sentence or a question sentence. The "declaration" refers to a sentence which indicates a user's opinion or idea. In the embodiment, as shown in FIG. 7, the declaration may be, for example, a sentence such as "I like Sato". The "location" refers to a sentence accompanying a geographical concept. The "time" refers to a sentence accompanying a temporal concept. The "negation" refers to a sentence when negating a declaration. Examples of the "Type of Utterance" are as shown in FIG. 7.

In the embodiment, in order for the input type determination unit 440 to determine the "Type of Utterance", as shown in FIG. 8, the input type determination unit 440 uses a definition expression dictionary for determining that it is a declaration, and a negation expression dictionary for determining that it is a negation, and the like. The input type determination unit 440, into which the letter string is input from the letter string specification unit 410, based on the input letter string, cross references the letter string and each dictionary stored in advance in an utterance type data base 450. The input type determination unit 440 which has carried out the cross referencing extracts, from the letter string, elements related to each dictionary.

The input type determination unit 440 determines the "Type of Utterance" based on the extracted elements. For example, in the event that an element making a declaration regarding a certain matter is included in the letter string, the input type determination unit 440 determines the letter string in which the element is included to be a declaration. The input type determination unit 440 transmits the determined "Type of Utterance" to an answer acquisition unit 380.

1.1.5. Conversation Data Base

Figure 9:
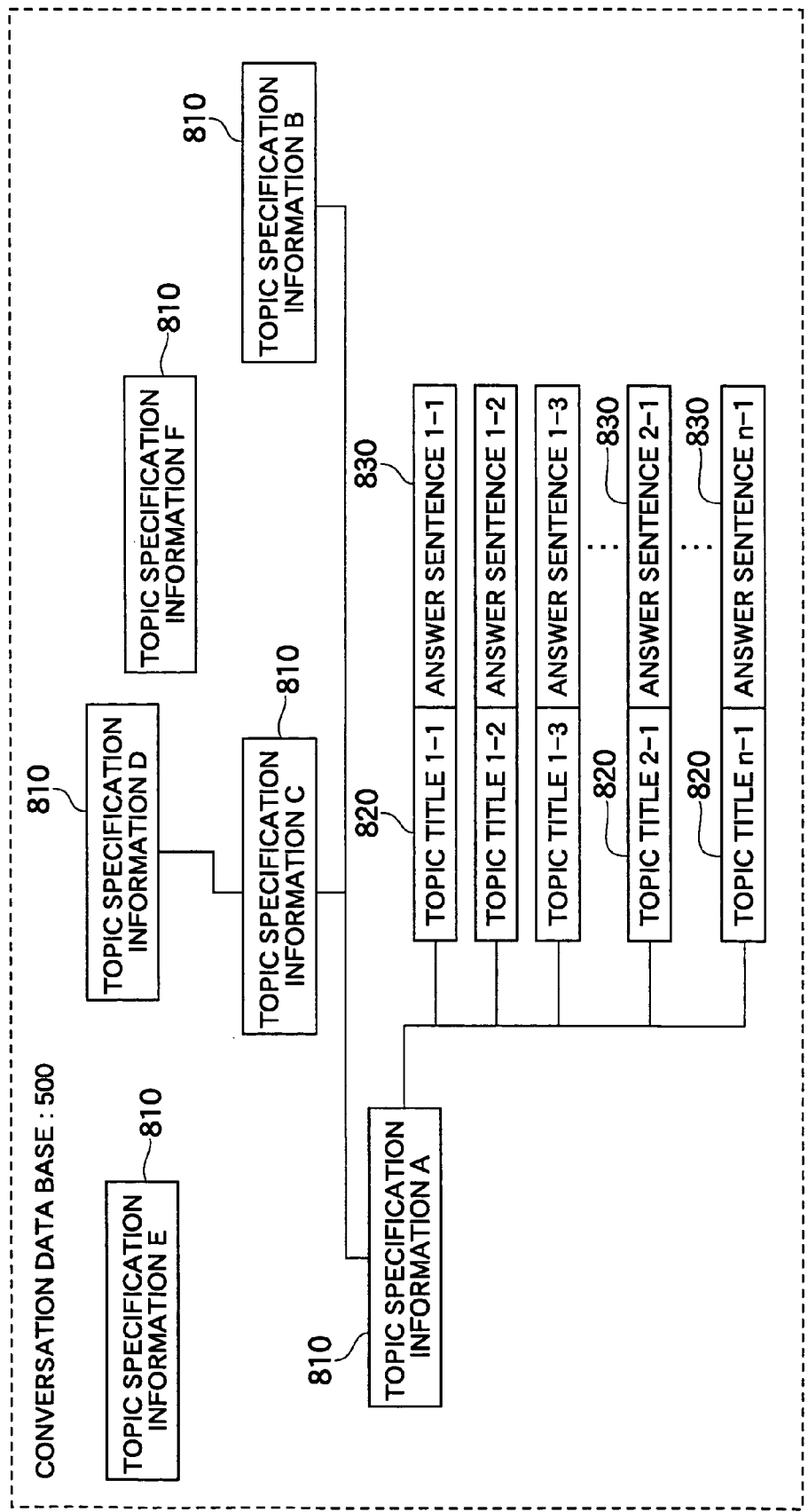
FIG. 9 is a conceptual diagram showing a data configuration example of data stored in a conversation data base.

Next, a description will be given of a data configuration example of data stored in the conversation data base 500, while referring to FIG. 9. FIG. 9 is a schematic diagram showing a configuration example of the data stored in the conversation data base 500.

The conversation data base 500, as shown in FIG. 9, stores in advance a plurality of items of topic specification information 810. Also, it is acceptable that each item of topic specification information 810 is correlated to other items of topic specification information 810, for example, as shown in FIG. 9, in the event that topic specification information C (810) is specified, other topic specification information A (810), topic specification information B (810) and topic specification information D (810), correlated to the topic specification information C (810), is fixed and stored.

Specifically, in the embodiment, the topic specification information 810 refers to input details expected to be input by the user, or a "keyword" with a connection to an answer sentence to the user.

One or a plurality of topic titles 820 are correlated to the topic specification information 810, and stored. The topic title 820 is configured of a morpheme composed of one letter, a plurality of letter strings, or a combination thereof. An answer sentence 830 to the user is correlated to each topic title 820, and stored. Also, a plurality of answer types indicating a type of the answer sentence 830 is correlated to the answer sentence 830.

Figure 10:
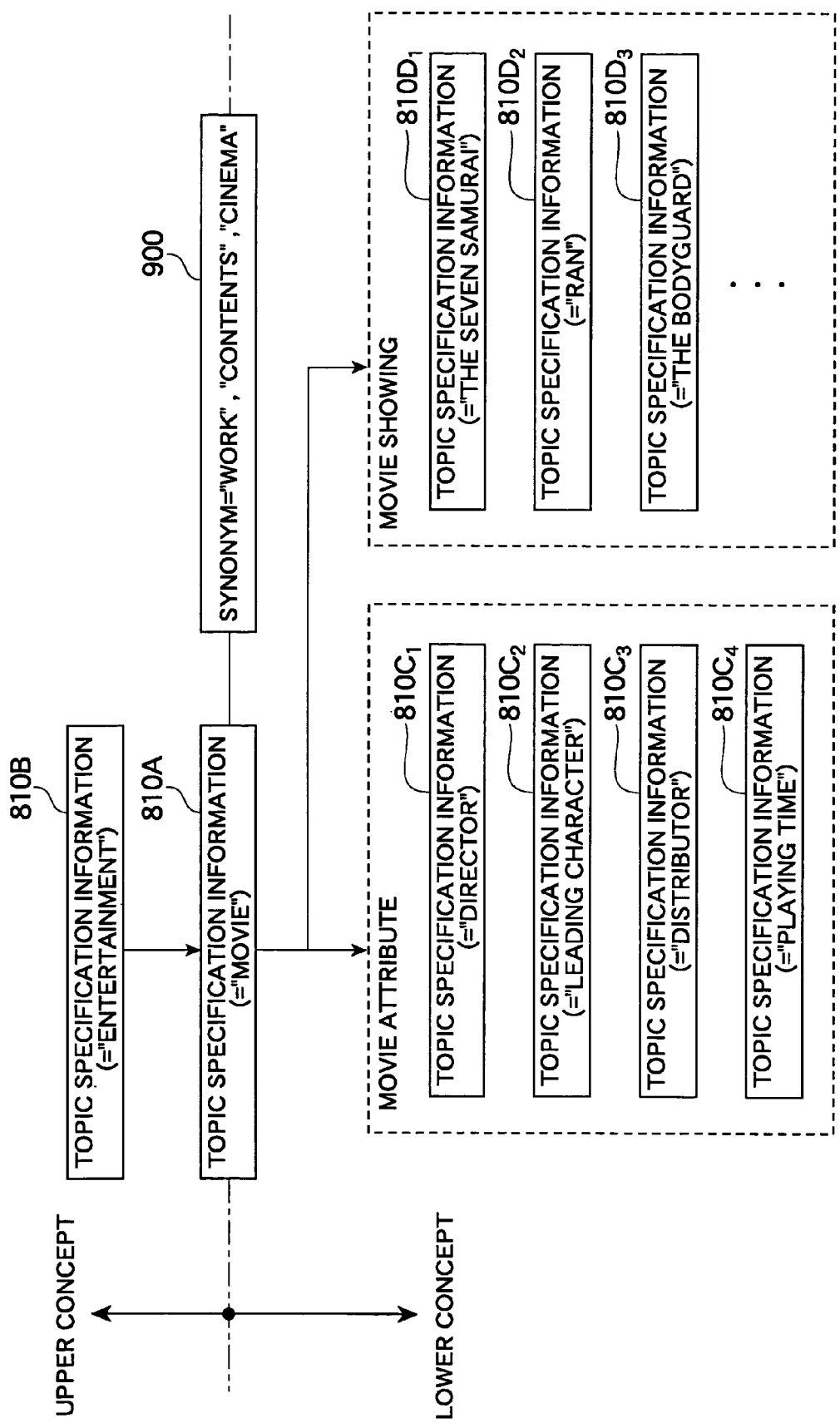
FIG. 10 is a diagram showing a correlation between a certain item of topic specification information and other items of topic specification information.

Next, a description will be given of a correlation between a certain item of topic specification information 810 and other items of topic specification information 810. FIG. 10 is a diagram showing a correlation between a certain item of topic specification information 810A and other items of topic specification information 810B, 810C1 to 810C4, 810D1 to 810D3 . . . . In the following description, "correlated to and stored in" refers to the fact that, when a certain item of information X is read off, an item of information Y correlated to the item of information X can be read off, for example, a condition in which information for recalling the item of information Y (for example, a pointer showing a storage area address of the item of information Y, a physical memory address of the storage area of the item of information Y, a logical address and the like) is stored in the item of information X is referred to as "the item of information Y is "correlated to and stored in" the item of information X".

In the example shown in FIG. 10, other items of topic specification information can be correlated to and stored in the item of topic specification information by upper concept, lower concept, synonym and antonym (omitted in the example in the figure). In the example shown in the figure, with respect to the topic specification information 810A (="movie"), the topic specification information 810B (="entertainment"), being correlated to and stored in the topic specification information 810A as the upper concept topic specification information 810, is stored in, for example, an upper layer of the topic specification information 810A ("movie").

Also, with respect to the topic specification information 810A (="movie"), the lower concept item of topic specification information 810C1 (="director"), the item of topic specification information 810C2 (="leading role"), the item of topic specification information 810C3 (="distributor"), the item of topic specification information 810C4 (="running time"), and the item of topic specification information 810D1 (="The Seven Samurai"), the item of topic specification information 810D2 (="Ran"), and the item of topic specification information 810D3 (="Yojinbo the Bodyguard") are correlated to and stored in the topic specification information 810A.

Also, a synonym 900 is correlated to the topic specification information 810A. The example shows a situation in which "work", "contents" and "cinema" are stored as synonyms of the keyword "movie", which is the item of specification information 810A. By fixing this kind of synonym, even though the keyword "movie" is not included in the utterance, in the event that "work", "contents" or "cinema" is included in the utterance etc., it is possible to proceed as though the topic specification information 810A is included in the utterance etc.

The conversation control apparatus 1 according to the embodiment, with reference to the stored contents of the conversation data base 500, on specifying an item of topic specification information 810, can search for and extract another item of topic specification information 810 correlated to and stored in the topic specification information 810, and the topic title 820 and answer sentence 830 of the topic specification information 810, and the like, at a high speed.

Next, a description will be given of a data configuration example of the topic title 820 (also known as "second morpheme information"), while referring to FIG. 11. FIG. 11 is a diagram showing a data configuration example of the topic title 820.

The items of topic specification information 810D1, 810D2, 810D3, . . . each have a plurality of differing topic titles 8201, 8202, . . . , topic titles 8203, 8204, . . . , and topic titles 8205, 8206. In the embodiment, as shown in FIG. 11, each topic title 820 is an item of information configured of first specification information 1001, second specification information 1002 and third specification information 1003. Herein, in the embodiment, the first specified information 1001 refers to a main morpheme configuring a topic. For example, a subject which configures a sentence may be considered as an example of the first specification information 1001. Also, in the embodiment, the second specification information 1002 refers to a morpheme having a close relationship with the first specification information 1001. For example, an object may be considered as the second specification information 1002. Furthermore, in the embodiment, the third specification information 1003 refers to a morpheme indicating an action connected with a certain subject, or a morpheme qualifying a noun or the like. For example, a verb, an adverb or an adjective may be considered as the third specification information 1003. It is not necessary that the meanings of the first specification information 1001, second specification information 1002 and third specification information 1003 are limited to the contents described heretofore as, even when giving another meaning (another part of speech) to the first specification information 1001, second specification information 1002 and third specification information 1003, as long as the contents of the sentence can be ascertained, the embodiment is effected.

For example, in a case in which a subject is "The Seven Samurai" and an adjective is "interesting", as shown in FIG. 11, the topic title (the second morpheme information) 8202 is configured of the morpheme "The Seven Samurai", which is the first specified information 1001, and the morpheme "interesting", which is the third specified information 1003. As no morpheme pertaining to the second specified information 1002 is included in the topic title 8202, a sign "*" is stored as the second specified information 1002 to indicate that there is no relevant morpheme.

The topic title 8202 (The Seven Samurai; *; interesting) means "The Seven Samurai is interesting". Hereafter, contents of brackets configuring the topic title 820 are in an order of, from the left, the first specification information 1001, second specification information 1002 and third specification information 1003. Also, in the event that there is no pattern information included in the first to third specification, of the topic title 820, that portion is indicated by "*".

The specified information configuring the topic title 820 is not limited to three as in the kind of first to third specified information, as it is acceptable, for example, to have further other specified information (fourth specified information or higher ordinal numeral specified information).

Next, a description will be given of the answer sentence 830 with reference to FIG. 12. In the embodiment, as shown in FIG. 12, the answer sentence 830, in order to give an answer corresponding to a type of utterance uttered by the user, is categorized into types (answer types) such as the declaration (D), the time (T), the location (L) and the negation (N), and prepared by type. Also, an affirmative sentence is (A) and a question sentence (Q).

A description will be given of a data configuration example of the topic specification information 810 with reference to FIG. 13. FIG. 13 shows a specific example of the topic titles 820 and answer sentences 830 correlated to a certain item of topic specification information 810 "Sato".

A plurality of topic titles (820) 1-1, 1-2, . . . are correlated to the item of topic specification information 810 "Sato". An answer sentence (830) 1-1, 1-2, . . . is correlated to and stored in each topic title (820) 1-1, 1-2, . . . . The answer sentence 830 is prepared for each answer type.

In a case in which the topic title (820) 1-1 is (Sato; *; like) {this is an extracted morpheme included in "I like Sato"}, the answer sentences (830) 1-1 corresponding to the topic title (820) 1-1 may be (DA; a declaration affirmative sentence "I like Sato too"), (TA; a time affirmative sentence "I like Sato when he's standing in the batter box"), and the like. The answer acquisition unit 380, to be described hereafter, with reference to an output of the input type determination unit 440, acquires one answer sentence 830 correlated to the topic title 820.

Next plan prescription information 840, which is information prescribing an answer sentence (called a "next answer sentence") to be preferentially transmit in response to the user utterance, is fixed, for each answer sentence, in such a way as to correspond to the relevant answer sentence. The next plan prescription information 840 can be any kind of information, as long as it is information which can specify the next answer sentence, for example, it is an answer sentence ID which can specify at least one answer sentence from among all the answer sentences stored in the conversation data base 500.

Although, in the embodiment, the next plan prescription information 840 is described as information which specifies the next answer sentence in a unit of an answer sentence (for example, the answer sentence ID), it is also acceptable that the next plan prescription information 840 is information which specifies the next answer sentence in a unit of the topic title 820 or the topic specification information 810 (in this case, as a plurality of answer sentences is prescribed as the next answer sentences, it is called a next answer sentence collection. However, it is one of the answer sentences included in the answer sentence collection which is actually transmitted as the answer sentence.). For example, even in the event that the topic title ID or the topic specification information ID is used as the next plan prescription information, the embodiment is effected.

1.1.6. Conversation Controller

Returning now to FIG. 5, a description will be given of a configuration example of the conversation controller 300.

The conversation controller 300, as well as controlling a transfer of data between each component inside the conversation control apparatus 1 (the sound recognition unit 200, the structure analyzer 400, the conversation data base 500, the output unit 600 and the sound recognition dictionary memory 700), has a function which determines and transmits an answer sentence in response to the user utterance.

In the embodiment, as shown in FIG. 5, the conversation controller 300 includes a manager 310, a planned conversation processor 320, a talk space conversation control processor 330, and a CA conversation processor 340. Hereafter, a description will be given of these components.

1.1.6.1. Manager

The manager 310 has a function which stores a talk history and updates it as necessary. The manager 310 has a function which, in response to a request from the topic specification information search unit 350, an abbreviation expansion unit 360, a topic search unit 370 and the answer acquisition unit 380, transfers all or a part of the stored talk history to each of the units.

1.1.6.2 Planned Conversation Processor

The planned conversation processor 320 has a function of executing a plan, establishing a conversation with the user which accords with the plan. The "plan" refers to providing the user with predetermined answers in accordance with a predetermined order. Hereafter, a description will be given of the planned conversation processor 320.

The planned conversation processor 320 has a function of transmitting the predetermined answers in accordance with the predetermined order, in response to the user utterance.

Figure 14:
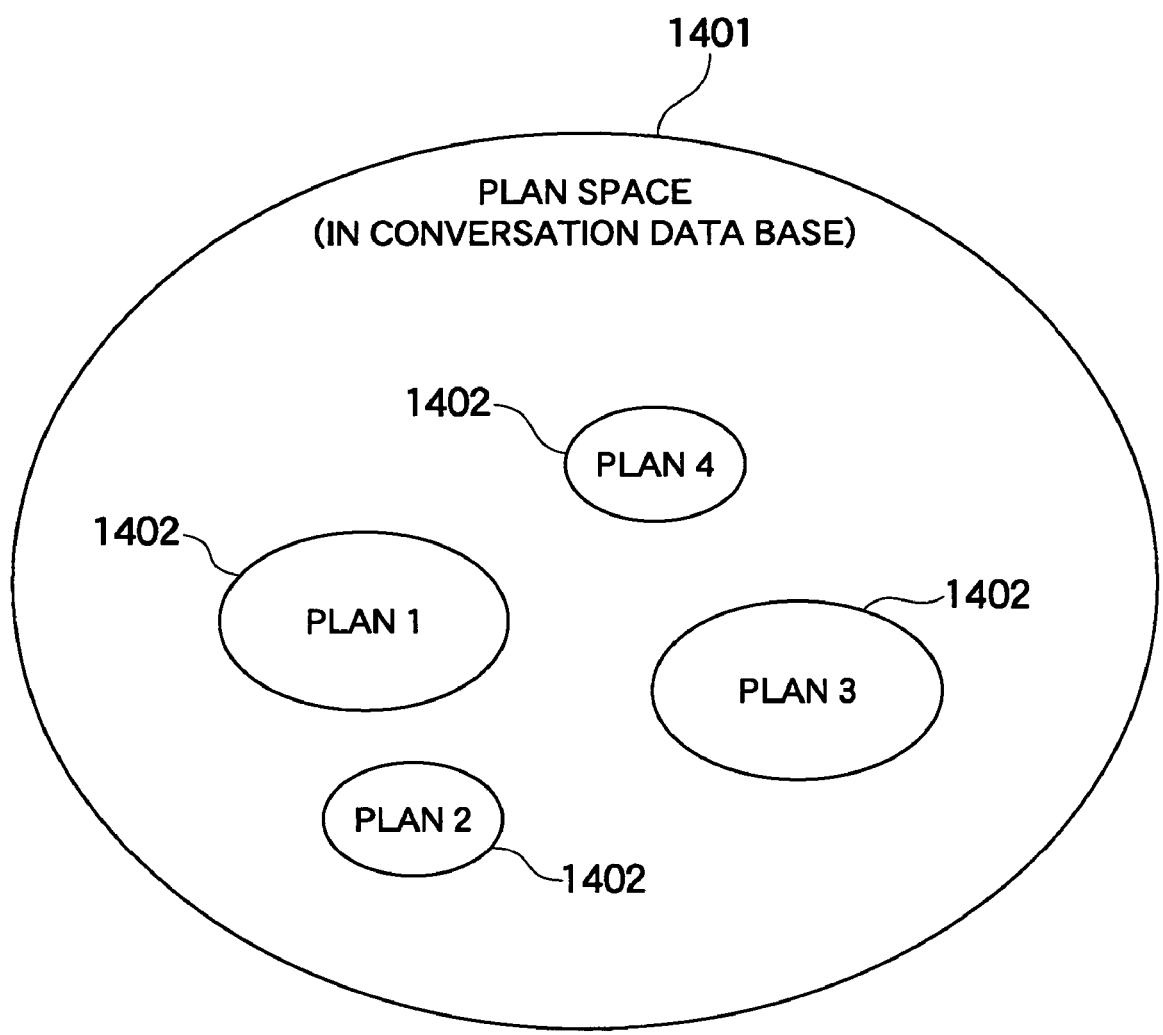
FIG. 14 is a conceptual diagram for describing a plan space.

FIG. 14 is a conceptual diagram for describing the plan. As shown in FIG. 14, a plurality of plans 1402 such as plan 1, plan 2, plan 3 and plan 4 are prepared in advance in a plan space 1401. The plan space 1401 refers to a grouping of the plurality of plans 1402 stored in the conversation data base 500. The conversation control apparatus 1 selects a plan, fixed in advance for use in starting, at an apparatus start up time or at a conversation starting time, or selects a plan 1402 as appropriate from the plan space 1401 in accordance with the contents of the user utterance, and transmits an answer sentence to the user utterance using the selected plan 1402.

Figure 15:
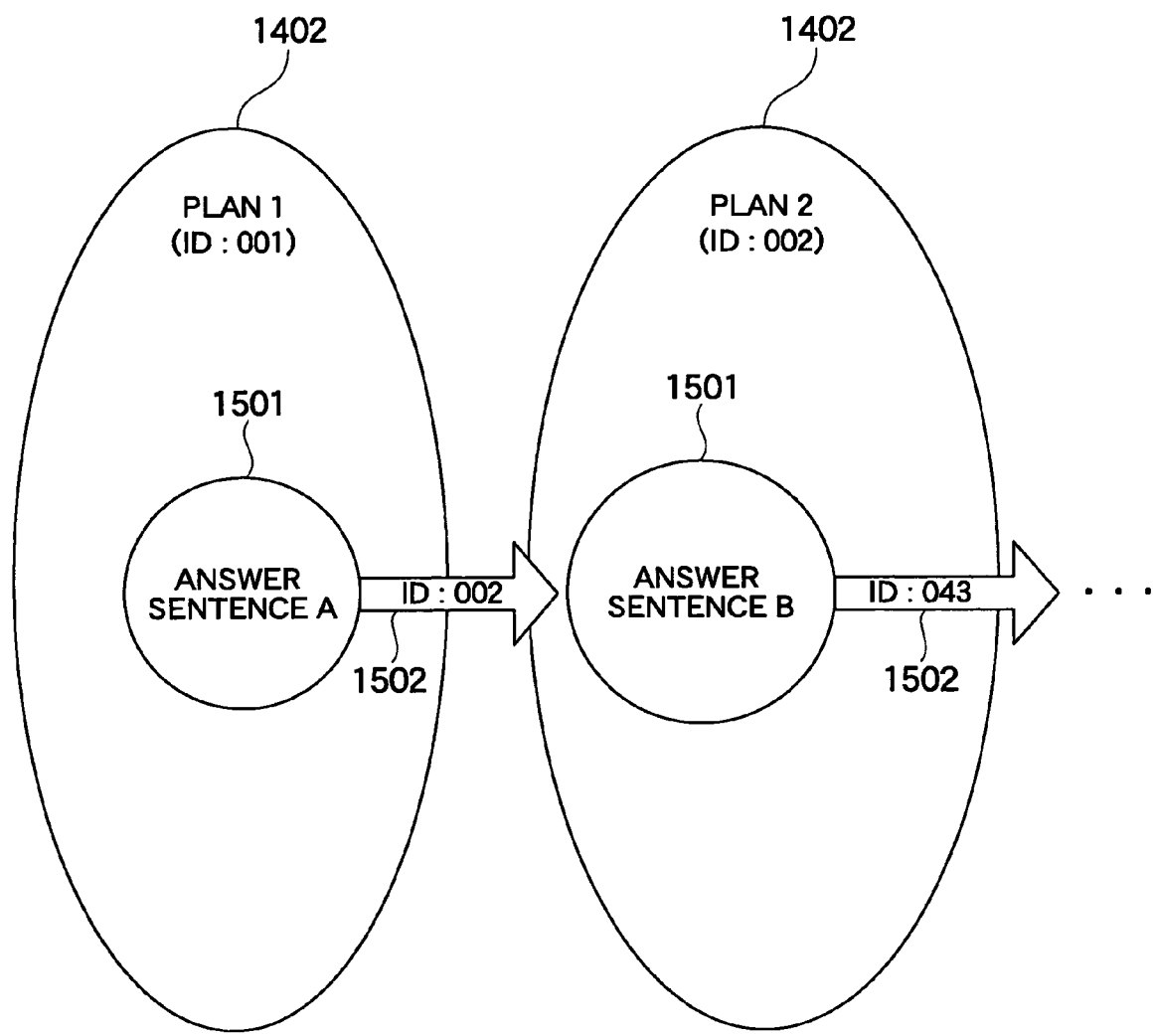
FIG. 15 is a diagram showing an example of the plan.

FIG. 15 is a diagram showing a configuration example of the plan 1402. The plan 1402 includes an answer sentence 1501 and next plan prescription information 1502 correlated thereto. The next plan prescription information 1502 is information specifying the plan 1402 which includes the answer sentence due to be transmitted to the user after the answer sentence 1501 included in the relevant plan 1402 (called a next candidate answer sentence). In the example, the plan 1 includes an answer sentence A (1501) transmitted by the conversation control apparatus 1 when the plan 1 is executed, and the next plan prescription information 1502 correlated to the answer sentence A (1501). The next plan prescription information 1502 is information (ID:002) specifying the plan 1402 which includes an answer sentence B (1501), which is the next candidate answer sentence for the answer sentence A (1501). In the same way, the next plan prescription information 1502 being fixed for the answer sentence B (1501), when the answer sentence B (1501) is transmitted, the plan 2 (1402) which includes the next candidate answer sentence is prescribed. In this way, the plans 1402 are consecutively connected by the next plan prescription information 1502, realizing a planned conversation in which a series of consecutive contents is transmitted to the user. That is, by dividing contents desired to be relayed to the user (a description, a guide, a survey and the like) into a plurality of answer sentences, and predetermining an order of each answer sentence and preparing them as the plan, it is possible to provide the user with the answer sentences in order in response to the user utterance. As long as there is a user utterance responding to a transmission of an immediately preceding answer sentence, it is not essential that the answer sentence 1501 included in the plan 1402 prescribed by the next plan prescription information 1502 is transmitted immediately, as it is also possible that the answer sentence 1501 included in the plan 1402 prescribed by the next plan prescription information 1502 is transmitted after a conversation between the user and the conversation control apparatus 1 on a topic other than the plan.

The answer sentence 1501 shown in FIG. 15 corresponds to one answer sentence letter string in the answer sentence 830 shown in FIG. 13, while the next plan prescription information 1502 shown in FIG. 15 corresponds to the next plan prescription information 840 shown in FIG. 13.

Figure 16:
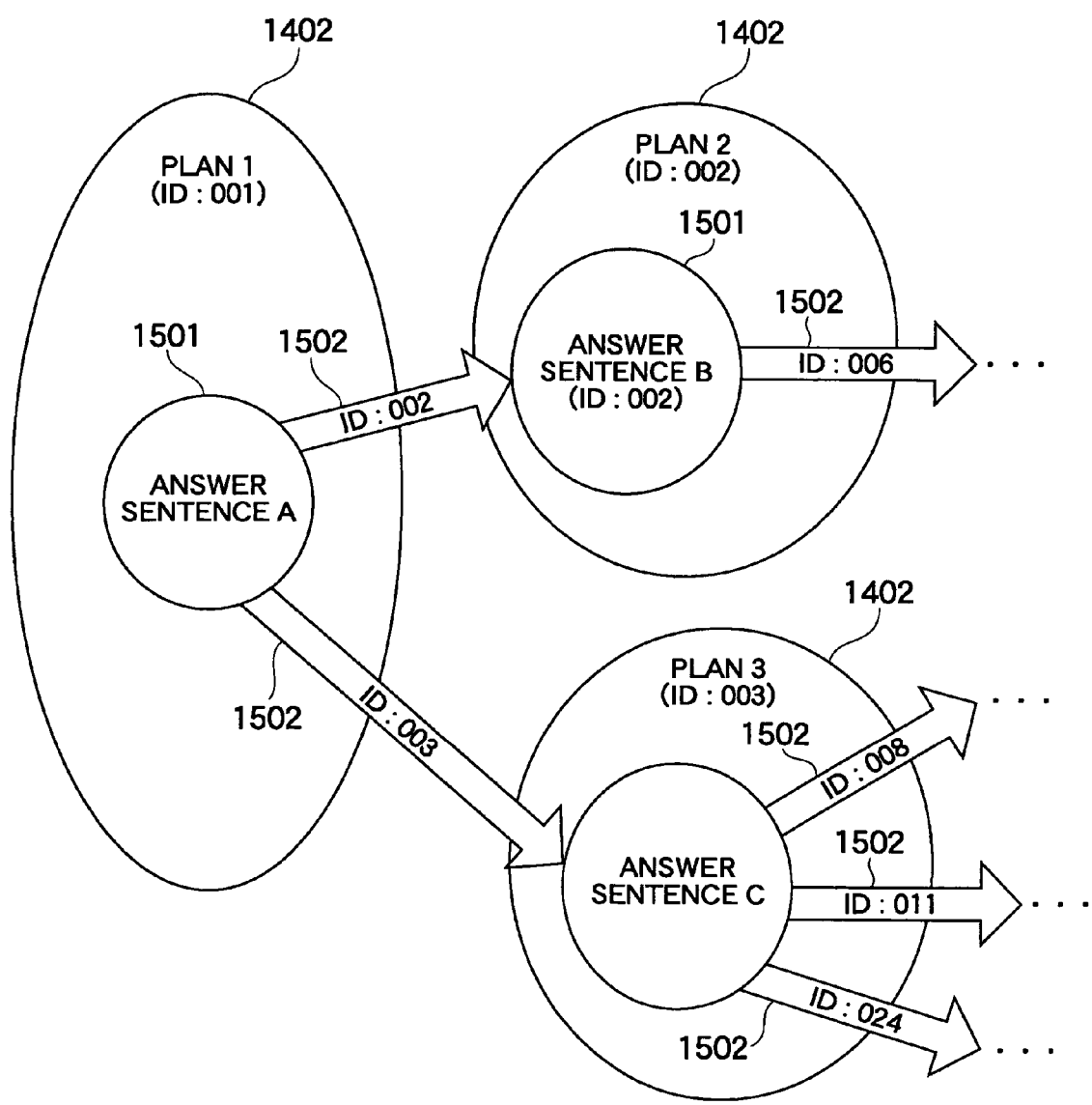
FIG. 16 is a diagram showing an example of a different plan.

The connections of the plans 1402 are not limited to the kind of one-dimensional matrix shown in FIG. 15. FIG. 16 is a diagram showing an example of plans 1402 having a kind of connection different to that in FIG. 15. In the example shown in FIG. 16, the plan 1 (1402) has two answer sentences 1501 forming the next candidate answer sentences, that is, two items of next plan prescription information 1502 which can prescribe the plan 1402. In order to fix two plans 1402, the plan 2 (1402) having the answer sentence B (1501) and the plan 3 (1402) having the answer sentence C (1501), as the plan 1402 including the next candidate answer sentences in a case in which a certain answer sentence A (1501) is transmitted, two items of next plan prescription information 1502 are provided. The answer sentence B and the answer sentence C being selective and alternative, in the event that one is transmitted, the plan 1 (1402) finishes without the other being transmitted. In this way, the connections of the plans 1402 not being limited to a one-dimensional permutation formation, it is also acceptable that they have a branchlike coupling or a netlike coupling.

A number of next candidate answer sentences which each plan has is not limited. Also, it is also possible that the next plan prescription information 1502 does not exist for the plan 1402 which is an end of a talk.

FIG. 17 shows a specific example of a certain series of the plans 1402, of a type called a consecutive type scenario. A series of plans 14021 to 14024 corresponds to four answer sentences 15011 to 15014 for informing the user of information related to crisis management. The four answer sentences 15011 to 15014 all together configure one complete talk (a description). Each plan 14021 to 14024 respectively has ID data 17021 to 17024 known as "1000-01", "1000-02", "1000-03" and "1000-04". Numbers after a hyphen in the ID data are information indicating a transmission order. Also, each plan 14021 to 14024 has next plan prescription information 15021 to 15024 respectively. Contents of the next plan prescription information 15024 are data known as "1000-0F", but a number "0F" after a hyphen is information indicating that a plan due to be transmitted next does not exist, and that the relevant answer sentence is the end of the series of talks (the description).

In the example, in a case in which the user utterance is "tell me about crisis management in the event of a large earthquake", the planned conversation processor 320 starts executing the series of plans. That is, when the planned conversation processor 320 receives the user utterance "tell me about crisis management in the event of a large earthquake", the planned conversation processor 320 searches the plan space 1401, and investigates whether or not there is a plan 1402 having an answer sentence 15011 corresponding to the user utterance "tell me about crisis management in the event of a large earthquake". In the example, it is taken that a user utterance letter string 17011 corresponding to "tell me about crisis management in the event of a large earthquake" corresponds to a plan 14021.

When the planned conversation processor 320 discovers the plan 14021, it acquires the answer sentence 15011 included in the plan 14021 and, as well as transmitting the answer sentence 15011 as an answer corresponding to the user utterance, specifies a next candidate answer sentence by the next plan prescription information 15021.

Next, on receiving the user utterance, after transmitting the answer sentence 15011, via the input unit 100 or the sound recognition unit 200, the planned conversation processor 320 executes the plan 14022. That is, the planned conversation processor 320 determines whether or not to execute the plan 14022 prescribed by the next plan prescription information 15021, that is, a transmission of a second answer sentence 15012. Specifically, the planned conversation processor 320 compares a user utterance letter string (also called an example) 17012 correlated to the answer sentence 15012, or the topic title 820 (omitted in FIG. 17), with the received user utterance, and determines whether or not they match. In the event that they match, it transmits the second answer sentence 15012. Also, as next plan prescription information 15022 is described in the plan 14022 including the second answer sentence 15012, the next candidate answer sentence is specified.

In the same way, in response to the user utterance continued hereafter, the planned conversation processor 320 can move in sequence to the plan 14023 and the plan 14024, and transmit a third answer sentence 15013 and a fourth answer sentence 15014. The fourth answer sentence 15014 being a last answer sentence, when the transmission of the fourth answer sentence 15014 is complete, the planned conversation processor 320 completes the execution of the plan.

In this way, by executing the plans 14021 to 14024 one after another, it is possible to provide the user, in the predetermined order, with the conversation contents prepared in advance.

1.1.6.3. Talk Space Conversation Control Processor

Returning to FIG. 5, the description of the configuration example of the conversation controller 300 will be continued.

The talk space conversation control processor 330 includes the topic specification information search unit 350, the abbreviation expansion unit 360, the topic search unit 370 and the answer acquisition unit 380. The manager 310 controls a whole of the conversation controller 300.

The "talk history", being information which specifies a topic or theme of a conversation between the user and the conversation control apparatus 1, is information including at least one of "target topic specification information", "target topic title", "user input sentence topic specification information" and "answer sentence topic specification information", to be described hereafter. Also, the "target topic specification information", "target topic title", and "answer sentence topic specification information" included in the talk history, not being limited to ones fixed by an immediately preceding conversation, can also be ones which have become "target topic specification information", "target topic title", and "answer sentence topic specification information" during a prescribed period in the past, or an accumulative record thereof.

Hereafter, a description will be given of each unit configuring the talk space conversation control processor 330.

1.1.6.3.1. Topic Specification Information Search Unit

The topic specification information search unit 350 cross references the first morpheme information extracted by the morpheme extractor 420 with each item of topic specification information, and searches for an item of topic specification information, from among the items of topic specification information, which matches the morpheme configuring the first morpheme information. Specifically, in a case in which the first morpheme information input from the morpheme extractor 420 is configured of two morphemes "Sato" and "like", the topic specification information search unit 350 cross references the input first morpheme information and topic specification information collection.

In the event that a morpheme (for example "Sato") configuring the first morpheme information is included in a target topic title 820 focus (written as 820 focus in order to distinguish it from the topic titles sought so far and other topic titles), the topic specification information search unit 350 which carried out the cross referencing transmits the target topic title 820 focus to the answer acquisition unit 380. Meanwhile, in the event that the morpheme configuring the first morpheme information is not included in the target topic title 820 focus, the topic specification information search unit 350 determines the user input sentence topic specification information based on the first morpheme information, and transmits the input first morpheme information and the user input sentence topic specification information to the abbreviation expansion unit 360. The "user input sentence topic specification information" refers to topic specification information corresponding to a morpheme, from among the morphemes included in the first morpheme information, corresponding to contents which the user is talking about, or to topic specification information corresponding to a morpheme, from among the morphemes included in the first morpheme information, which have a possibility of corresponding to contents which the user is talking about.

1.1.6.3.2. Abbreviation Expansion Unit

The abbreviation expansion unit 360, using the items of topic specification information 810 sought so far (hereafter called the "target topic specification information") and the items of topic specification information 810 included in the preceding answer sentence (hereafter called the "answer sentence topic specification information"), by expanding the first morpheme information, generates a plurality of types of expanded first morpheme information. For example, in a case in which the user utterance is "like", the abbreviation expansion unit 360 includes the target topic specification information "Sato" in the first morpheme information "like", and generates the expanded first morpheme information "Sato, like".

That is, when the first morpheme information is taken as "W", and a grouping of the target topic specification information and the answer sentence topic specification information is taken as "D", the abbreviation expansion unit 360 includes the elements of the grouping "D" in the first morpheme information "W", and generates the expanded first morpheme information.

By this means, in a case in which a sentence configured using the first morpheme information, being an abbreviation, is not clear Japanese, or a like case, the abbreviation expansion unit 360, using the grouping "D", can include the elements of the grouping "D" (for example, "Sato") in the first morpheme information "W". As a result, the abbreviation expansion unit 360 can make the first morpheme information "like" into the expansion first morpheme information "Sato, like". The expanded first morpheme information "Sato, like" corresponds to the user utterance "I like Sato".

That is, even in a case in which the contents of the user utterance are an abbreviation, the abbreviation expansion unit 360 can expand the abbreviation using the grouping "D". As a result, the abbreviation expansion unit 360, even in the event that a sentence configured from the first morpheme information is an abbreviation, can make the sentence into correct Japanese.

Also, the abbreviation expansion unit 360, based on the grouping "D", searches for a topic title 820 which matches the expanded first morpheme information. In the event that a topic title 820 which matches the expanded first morpheme information is found, the abbreviation expansion unit 360 transmits the topic title 820 to the answer acquisition unit 380. The answer acquisition unit 380, based on an appropriate topic title 820 sought in the abbreviation expansion unit 360, can transmit an answer sentence 830 most appropriate to the contents of the user utterance.

The abbreviation expansion unit 360 is not limited to including the elements of the grouping "D" in the first morpheme information. It is also acceptable that the abbreviation expansion unit 360, based on the target topic title, includes a morpheme, included in any one of the first morpheme information, second morpheme information or third morpheme information configuring the topic title, in the extracted first morpheme information.

1.1.6.3.3. Topic Search Unit

The topic search unit 370, in the event that the topic title 810 is not decided in the abbreviation expansion unit 360, cross references the first morpheme information and each title 810 corresponding to the user input sentence topic specification information, and searches for a topic title 810, from among each topic title 810, which most closely matches the first morpheme information.

Specifically, the topic search unit 370, into which a search command signal from the abbreviation expansion unit 360 is input, based on the user input sentence topic specification information and the first morpheme information included in the input search command signal, searches for a topic title 810, from among each topic title correlated to the user input sentence topic specification information, which most closely matches the first morpheme information. The topic search unit 370 transmits the sought topic title 810 to the answer acquisition unit 380 as a search result signal.

The above mentioned FIG. 13 shows a specific example of the topic title 820 and answer sentence 830 correlated to a certain item of topic specification information 810 (="Sato"). As shown in FIG. 13, for example, as the topic specification information 810 (="Sato") is included in the input first morpheme information "Sato, like", the topic search unit 370 specifies the topic specification information 810 (="Sato"), then cross references each topic title (820) 1-1, 1-2, . . . correlated to the topic specification information 810 (="Sato") with the input first morpheme information "Sato, like".

The topic search unit 370, based on the cross reference result, specifies the topic title (820) 1-1 (Sato; \*; like), from among each topic title (820) 1-1 to 1-2, which matches the input first morpheme information "Sato, like". The topic search unit 370 transmits the sought topic title 820 1-1 (Sato; \*; like) to the answer acquisition unit 380 as a search result signal.

1.1.6.3.4. Answer Acquisition Unit

The answer acquisition unit 380, based on the topic title 820 sought in the abbreviation expansion unit 360 or the topic search unit 370, acquires the answer sentence 830 correlated to the topic title 820. Also, the answer acquisition unit 380, based on the topic title 820 sought in the topic search unit 370, cross references each answer type correlated to the topic title 820 with the utterance type determined by the input type determination unit 440. The answer acquisition unit 380 which has carried out the cross referencing searches for an answer type, from among each answer type, which matches the determined utterance type.

In the example shown in FIG. 13, in a case in which the topic title sought in the topic search unit 370 is the topic title 1-1 (Sato; \*; like), the answer acquisition unit 350 specifies an answer type (DA), from among the answer sentences 1-1 (DA, TA etc.) correlated to the topic title 1-1, which matches the "utterance type" determined by the input type determination unit 440 (for example DA). The answer acquisition unit 380 which has specified the answer type (DA), based on the specified answer type (DA), acquires the answer sentence 1-1 ("I like Sato too") correlated to the answer type (DA).

Herein, of "DA", "TA" etc., "A" means an affirmative form. Consequently, in the event that "A" is included in the utterance type and the answer type, it indicates an affirmation regarding a certain matter. Also, it is also possible to include a type such as "DQ" or "TQ" in the utterance type and the answer type. Of "DQ" and "TQ", "Q" means a question regarding a certain matter.

When the answer type comprises the question form (Q), an answer sentence correlated to the answer type is configured of the affirmative form (A). A sentence answering a question and the like can be considered as an answer sentence compiled by the affirmative form (A). For example, in the event that the uttered sentence is "have you ever operated a slot machine?", the utterance type for the uttered sentence is the question form (Q). The answer sentence correlated to the question form (Q) may be, for example, "I have operated a slot machine" (the affirmative form (A)).

Meanwhile, when the answer type comprises the affirmative form (A), an answer sentence correlated to the answer type is configured of the question form (Q). A question sentence asking a question regarding the utterance contents, or a question sentence asking about a specified matter, and the like can be considered as an answer sentence compiled by the question form (Q). For example, in the event that the uttered sentence is "my hobby is playing slot machines", the utterance type for the uttered sentence is the affirmative form (A). The answer sentence correlated to the affirmative form (A) may be, for example, "Isn't your hobby playing pachinko?" (the question form (Q) asking about a specified matter).

The answer acquisition unit 380 transmits the acquired answer sentence 830 to the manager 310 as the answer sentence signal. The manager 310 into which the answer sentence signal is input from the answer acquisition unit 380 transmits the input answer sentence signal to the output unit 600.

1.1.6.4. CA Conversation Processor

The CA conversation processor 340 has a function of transmitting an answer sentence which enables a continuation of a conversation with the user, in response to the contents of the user utterance, in the event that the answer sentence is not decided for the user utterance in either the planned conversation processor 320 or the talk space conversation control processor 330.

Returning to FIG. 1, the configuration example of the conversation control apparatus 1 will be restarted.

1.1.7. Output Unit

The output unit 600 transmits the answer sentence acquired by the answer acquisition unit 380. The output unit 600 can be, for example, a speaker, a display and the like. Specifically, the output unit 600 into which the answer sentence is input from the manager 310, based on the input answer sentence, outputs the answer sentence, for example "I like Sato too", with a sound.

This completes the description of the configuration example of the conversation control apparatus 1.

2. Conversation Control Method

The conversation control apparatus 1 having the configuration described heretofore executes a conversation control method by operating as described hereafter.

Next, a description will be given of an operation of the conversation control apparatus 1, or more specifically of the conversation controller 300, according to the embodiment.

FIG. 18 is a flowchart showing an example of a main process of the conversation controller 300. The main process being a process which is executed every time the conversation controller 300 receives a user utterance, an answer sentence to the user utterance is transmitted by means of the main process being carried out, and a conversation (a dialog) between the user and the conversation control apparatus 1 is established.

On entering the main process, the conversation controller 300, or more specifically the planned conversation processor 320, first executes a planned conversation control process (S1801). The planned conversation control process is a process which executes a plan.

FIG. 19 and FIG. 20 are flowcharts showing an example of the planned conversation control process. Hereafter, a description will be given of the example of the planned conversation control process while referring to FIG. 19 and FIG. 20.

On starting the planned conversation control process, the planned conversation processor 320 first carries out a basic control condition information check (S1901). An existence or otherwise of a completion of an execution of the plan 1402 is stored in a prescribed memory area as the basic control condition information.

The basic control condition information has a role of describing the basic control condition of a plan.

FIG. 21 is a diagram showing four basic control conditions which could arise with regard to a type of plan called a scenario. Hereafter, a description will be given of each condition.

1. Combination

This basic control condition is a case in which the user utterance matches the plan 1402 being executed, or more specifically the topic title 820 and example sentence 1701 corresponding to the plan 1402. In this case, the planned conversation processor 320 finishes the relevant plan 1402, and moves to the plan 1402 corresponding to the answer sentence 1501 prescribed by the next plan prescription information 1502.

2. Cancellation

This basic control condition is a basic control condition set in the event that it is determined that the contents of the user utterance are requesting a completion of the plan 1402, or in the event that it is determined that an interest of the user has moved to a matter other than the plan being executed. In the event that the basic control condition information indicates a cancellation, the planned conversation processor 320 finds whether or not there is a plan 1402, other than the plan 1402 which is a subject of the cancellation, corresponding to the user utterance and, in the event that it exists, starts an execution of the plan 1402 while, in the event that it does not exist, it finishes the execution of the plan.

3. Maintenance

This basic control condition is a basic control condition which is described in the basic control condition information in the event that the user utterance does not apply to the topic title 820 (refer to FIG. 13) or the example sentence 1701 (refer to FIG. 17) corresponding to the plan 1402 being executed, and that it is determined that the user utterance is not one which applies to the basic control condition "cancellation".

In the case of this basic control condition, the planned conversation processor 320, on receiving the user utterance, first deliberates whether or not to restart the plan 1402 which has been deferred or cancelled and, in the event that the user utterance is not appropriate for a restart of the plan 1402, for example, the user utterance does not correspond to the topic title 802 or the example sentence 1702 corresponding to the plan 1402, starts an execution of another plan 1402 or carries out a talk space conversation control process (S1802) to be described hereafter, or the like. In the event that the user utterance is appropriate for the restart of the plan 1402, the answer sentence 1501 is transmitted based on the stored next plan prescription information 1502.

In the case in which the basic control information is "maintenance", although the planned conversation processor 320 searches for another plan 1402 in order to be able to transmit an answer other than the answer sentence 1501 corresponding to the relevant plan 1402, or carries out the talk space conversation control process to be described hereafter and the like, in the event that the user utterance again becomes one related to the plan 1402, it restarts the execution of the plan 1402.

4. Continuation

This condition is a basic control condition set in the event that the user utterance does not correspond to the answer sentence 1501 included in the plan 1402 being executed, that it is determined that the contents of the user utterance do not apply to the basic control condition "cancellation", and that a user intention inferred from the user utterance is not clear.

In the case in which the basic control condition is "continuation", the planned conversation processor 320, on receiving the user utterance, first deliberates whether or not to restart the plan 1402 which has been deferred or cancelled and, in the event that the user utterance is not appropriate for a restart of the plan 1402, carries out a CA conversation control process to be described hereafter in order to be able to transmit an answer sentence to elicit a further utterance from the user.

Returning to FIG. 19, the description of the planned conversation control process will be continued.

The planned conversation processor 320 which has referred to the basic control condition information determines whether or not the basic control condition indicated by the basic control condition information is "combination" (S1902). In the event that it is determined that the basic control condition is "combination" (S1902, Yes), the planned conversation processor 320 determines whether or not the answer sentence 1501 is the last answer sentence in the plan 1402 being executed indicated by the basic control condition information (S1903).

In the event that it is determined that the last answer sentence 1501 has been transmitted (S1903, Yes), as all the contents to be answered to the user in the plan 1402 have already been conveyed, the planned conversation processor 320, in order to determine whether or not to start a new, separate plan 1402, carries out a search to find whether a plan 1402 corresponding to the user utterance exists inside a plan space (S1904). In the event that a plan 1402 corresponding to the user utterance cannot be found as a result of the search (S1905, No), as no plan 1402 to be provided to the user exists, the planned conversation processor 320 finishes the planned conversation control process as it is.

Meanwhile, in the event that a plan 1402 corresponding to the user utterance is found as a result of the search (S1905, Yes), the planned conversation processor 320 moves to the relevant plan 1402 (S1906). This is in order to start an execution of the relevant plan 1402 (a transmission of the answer sentence 1501 included in the plan 1402) because a plan 1402 to be provided to the user exists.

Next, the planned conversation processor 320 transmits the answer sentence 1501 of the relevant plan 1402 (S1908). The transmitted answer sentence 1501 being the answer to the user utterance, the planned conversation processor 320 provides the information desired to be conveyed to the user.

After the answer sentence transmission process (S1908), the planned conversation processor 320 completes the planned conversation control process.

Meanwhile, in the determination of whether or not the previously transmitted answer sentence 1501 is the last answer sentence 1501 (S1903), in the event that the previously transmitted answer sentence 1501 is not the last answer sentence 1501 (S1903, No), the planned conversation processor 320 moves to a plan 1402 corresponding to an answer sentence 1501 succeeding the previously transmitted answer sentence 1501, that is, an answer sentence 1501 specified by the next plan prescription information 1502 (S1907).

After this, the planned conversation processor 320 transmits the answer sentence 1501 included in the relevant plan 1402, carrying out an answer to the user utterance (S1908). The transmitted answer sentence 1501 being the answer to the user utterance, the planned conversation processor 320 provides the information desired to be conveyed to the user. After the answer sentence transmission process (S1908), the planned conversation processor 320 completes the planned conversation control process.

In the event that it is determined, in the determination process in S1902, that the basic control condition is not "combination" (S1902, No), the planned conversation processor 320 determines whether or not the basic control condition indicated by the basic control condition information is "cancellation" (S1909). In the event that it is determined that the basic control condition is "cancellation" (S1909, Yes), as no plan 1402 to be continued exists, the planned conversation processor 320, in order to determine whether or not a new, separate plan 1402 to be started exists, carries out a search to find whether a plan 1402 corresponding to the user utterance exists inside a plan space 1401 (S1904). After this, in the same way as the above described process in S1903 (Yes), the planned conversation processor 320 executes the processes from S1905 to S1908.

Meanwhile, in the determination of whether or not the basic control condition indicated by the basic control condition information is "cancellation" (S1909), in the event that it is determined that the basic control condition is not "cancellation" (S1909, No), the planned conversation processor 320 further determines whether or not the basic control condition indicated by the basic control condition information is "maintenance" (S1910).

In the event that the basic control condition indicated by the basic control condition information is "maintenance" (S1910, Yes), the planned conversation processor 320 investigates whether or not the user has again shown an interest in a deferred or cancelled plan 1402 and, in the event that an interest is shown, operates in such a way as to restart the plan 1402 which has been temporarily deferred or cancelled. That is, the planned conversation processor 320 inspects the plan 1402 which is in a state of deferment or cancellation (FIG. 20; S2001), and determines whether or not the user utterance corresponds to the plan 1402 which is in a state of deferment or cancellation (S2002).

In the event that it is determined that the user utterance corresponds to the relevant plan 1402 (S2002, Yes), the planned conversation processor 320 moves to the plan 1402 corresponding to the user utterance (S2003). After that, in order to transmit the answer sentence 1501 included in the plan 1402, it executes the answer sentence transmission process (FIG. 19; S1908). By operating in this way, the planned conversation processor 320, in response to the user utterance, can restart the plan 1402 which has been deferred or cancelled, and it becomes possible to relay all of the contents included in a plan 1402 prepared in advance to the user.

Meanwhile, in the event that it is determined, in the above S2002 (refer to FIG. 20) that the plan 1402 which is in a state of deferment or cancellation does not correspond to the user utterance (S2002, No), the planned conversation processor 320, in order to determine whether or not a new, separate plan 1402 to be started exists, carries out a search to find whether a plan 1402 corresponding to the user utterance exists inside a plan space 1401 (FIG. 19; S1904). After this, in the same way as the above described process in S1903 (Yes), the planned conversation processor 320 executes the processes from S1905 to S1909.

In the event that it is determined, in the determination in S1910, that the basic control condition indicated by the basic control condition information is not "maintenance" (S1910, No), it means that the basic control condition indicated by the basic control condition information is "continuation". In this case, the planned conversation processor 320 completes the planned conversation control process without transmitting an answer sentence.

This completes the description of the planned conversation control process.

Returning to FIG. 18, the description of the main process will be continued.

On completing the planned conversation control process (S1801), the conversation controller 300 starts the talk space conversation control process (S1802). However, in the event that an answer sentence transmission is carried out in the planned conversation control process (S1801), the conversation controller 300 carries out a basic control information update process (S1904) and completes the main process, without carrying out either the talk space conversation control process (S1802) or the CA conversation control process to be described hereafter (S1803).

FIG. 22 is a flowchart showing an example of the talk space conversation control process according to the embodiment.

Firstly, the input unit 100 carries out a step to acquire the utterance contents from the user (step S2201). Specifically, the input unit 100 acquires a sound which configures the utterance contents of the user. The input unit 100 transmits the acquired sound as a sound signal to the sound recognition unit 200. It is also acceptable that the input unit 100 acquires a letter string input by the user (for example, letter data input in text format) rather than a sound from the user. In this case, the input unit 100 is a letter input device, such as a keyboard or a touch panel, rather than a microphone.

Continuing, the sound recognition unit 200, based on the utterance contents acquired by the input unit 100, carries out a step to identify a letter string corresponding to the utterance contents (step S2202). Specifically, the sound recognition unit 200, into which the sound signal from the input unit 100 is input, based on the input sound signal, specifies a word hypothesis (a candidate) correlated to the sound signal. The sound recognition unit 200 acquires the letter string corresponding to the specified word hypothesis (the candidate), and transmits the acquired letter string to the conversation controller 300, or more specifically to the talk space conversation control processor 330, as a letter string signal.

Then, a letter string specification unit 410 carries out a step to divide the letter string series specified by the sound recognition unit 200 into individual sentences (step S2203). Specifically, the letter string specification unit 410 into which the letter string signal (or the morpheme signal) is input from the manager 310, when there is a time interval of a certain length or more in the series of letter strings, divides the letter string at that portion. The letter string specification unit 410 transmits each divided letter string to the morpheme extractor 420 and the input type determination unit 440. In the event that the input letter string is a letter string input from a keyboard, it is preferable that the letter string specification unit 410 divides the letter string where there is a punctuation mark, a space or the like.

After that, the morpheme extractor 420, based on the letter string specified by the letter string specification unit 410, carries out a step to extract each morpheme configuring the minimum unit of the letter string as the first morpheme information (step S2204). Specifically, the morpheme extractor 420, into which the letter string is input from the letter string specification unit 410, cross references the input letter string and a morpheme collection stored in advance in the morpheme data base 430. The morpheme collection is prepared as a morpheme dictionary describing a morpheme headword, reading, part of speech, conjugation and the like for each morpheme belonging to each part of speech category.

The morpheme extractor 420 which has carried out the cross referencing extracts, from the input letter string, each morpheme (m1, m2, . . . ) which matches any one of the morpheme collections stored in advance. The morpheme extractor 420 transmits each morpheme extracted to the topic specification information search unit 350 as the first morpheme information.

Continuing, the input type determination unit 440, based on each morpheme configuring one sentence specified by the letter string specification unit 410, carries out a step to determine the "Type of Utterance" (step S2205). Specifically, the input type determination unit 440, into which the letter string is input from the letter string specification unit 410, based on the input letter string, cross references the letter string with each dictionary stored in the utterance type data base 450, and extracts, from the letter string, elements related to each dictionary. The input type determination unit 440 which has extracted the elements determines, based on the extracted elements, which "Utterance Type" the elements belong to. The input type determination unit 440 transmits the determined "Type of Utterance" (the utterance type) to the answer acquisition unit 380.

Then, the topic specification information search unit 350 carries out a step to compare the first morpheme information extracted by the morpheme extractor 420 with the target topic title 820 focus (step S2206). In the event that a morpheme configuring the first pattern matches the target topic title 820 focus, the topic specification information search unit 350 transmits the topic title 820 to the answer acquisition unit 380. Meanwhile, in the event that the morpheme configuring the first morpheme information does not match the topic title 820, the topic specification information search unit 350 transmits the input first morpheme information and the user input sentence topic specification information to the abbreviation expansion unit 360 as a search command signal.

After that, the abbreviation expansion unit 360, based on the first morpheme information input from the topic specification information search unit 350 carries out a step to include the target topic specification information and the answer sentence topic specification information in the input first morpheme information (step S2207). Specifically, when the first morpheme information is taken as "W", and a grouping of the target topic specification information and the answer sentence topic specification information is taken as "D", the abbreviation expansion unit 360 includes the elements of the topic specification information "D" in the first morpheme information "W", generates the expanded first morpheme information, cross references the expanded first morpheme information with all the topic titles 820 correlated to the grouping "D", and carries out a search of whether or not there is a topic title 820 which matches the expanded first morpheme information. In the event that there is a topic title 820 which matches the expanded first morpheme information, the abbreviation expansion unit 360 transmits the topic title 820 to the answer acquisition unit 380. Meanwhile, in the event that a topic title 820 which matches the expanded first morpheme information is not found, the abbreviation expansion unit 360 transfers the first morpheme information and the user input sentence topic specification information to the topic search unit 370.

Continuing, the topic search unit 370 carries out a step to cross reference the first morpheme information and the user input sentence topic specification information, and search for a topic title 820, from among each topic title 820, which matches the first morpheme information (step S2208). Specifically, the topic search unit 370, into which a search command signal from the abbreviation expansion unit 360 is input, based on the user input sentence topic specification information and the first morpheme information included in the input search command signal, searches for a topic title 820, from among each topic title 820 correlated to the user input sentence topic specification information, which matches the first morpheme information. The topic search unit 370 transmits the topic title 820 acquired as a result of the search to the answer acquisition unit 380 as a search result signal.

Continuing, the answer acquisition unit 380, based on the topic title 820 sought in the topic specification information search unit 350, the abbreviation expansion unit 360 or the topic search unit 370, cross references the user utterance type determined by the structure analysis unit 400 with each answer type correlated to the topic title 820, and carries out a selection of the answer sentence 830 (step S2209).

Specifically, the selection of the answer sentence 830 is carried out as described hereafter. That is, the answer acquisition unit 380, into which the search result signal from the topic specification unit 370 and the "utterance type" from the input type determination unit 440 are input, based on the "topic title" correlated to the search result signal and the input "utterance type", specifies an answer type, from among the answer sentence collection correlated to the "topic title", which matches the "utterance type" (DA etc.).

Continuing, the answer acquisition unit 380 transmits the answer sentence 830 acquired in step S2209 to the output unit 600 via the manager 310 (step S2210). The output unit 600 which has received the answer sentence from the manager 310 transmits the input answer sentence.

This completes the description of the talk space conversation control process. Returning to FIG. 18, the description of the main process will be restarted.

The conversation controller 300, on completing the talk space conversation control process, executes the CA conversation control process (S1803). However, in the event that an answer sentence transmission is carried out in the planned conversation control process (S1801) and the talk space conversation control process (S1803), the conversation controller 300 carries out a basic control information update process (S1804) and completes the main process, without carrying out the CA conversation control process (S1803).

The CA conversation control process (S1803) is a process which determines whether the user utterance is "explaining something", "confirming something", "criticizing and attacking" or "something else", and transmits an answer sentence according to the contents of the user utterance and a determination result. By carrying out the CA conversation control process, even in the event that an answer sentence matching the user utterance cannot be output in either the planned conversation process or the talk space conversation process, it is possible to transmit a so-called "connection" answer sentence which enables continuity without a break in a flow of the conversation with the user.

Next, the conversation controller 300 carries out a basic control information update process (S1804). In the process, the conversation controller 300, or more specifically the manager 310, sets the basic control information to "combination" in the event that the planned conversation processor 320 has carried out the answer sentence transmission, sets the basic control information to "cancellation" in the event that the planned conversation processor 320 has stopped the answer sentence transmission, sets the basic control information to "maintenance" in the event that the talk space conversation control processor 330 has carried out the answer sentence transmission, and sets the basic control information to "continuation" in the event that the CA conversation processor 340 has carried out the answer sentence transmission.

The basic control information set in the basic control information update process is referred to in the planned conversation control process (S1801), and used in a continuation or restart of the plan.

As described heretofore, by executing the main process every time a user utterance is received, the conversation control apparatus 1 can, in response to the user utterance, as well as being able to execute a plan prepared in advance, also respond as appropriate to a topic not included in the plan.

B. Second Embodiment

Next, a description will be given of a second embodiment of the invention. A conversation control apparatus 1 according to the second embodiment has a feature of being able to manage a type of plan called a compulsory type scenario, which is a plan in which answer sentences are transmitted in such a way that predetermined answer sentences are caused to be output in a predetermined order, whatever kind of contents user utterance contents might be. In such a conversation control apparatus 1, at least one portion of a plurality of plans 1402 stored in a conversation data base 500 being, for example, N plans storing answer sentences from a first to an $N^{th}$ which are transmitted in order, the $M^{th}$ plan from among the N plans includes next candidate prescription information prescribing a first answer sentence after the $M^{th}$ (note that M and N are integers, and $1 \leq M < N$).

In the description of the conversation control apparatus 1 according to the second embodiment, a description will be given of only areas differing from the first embodiment, and a description of a configuration or an operation which is identical to that of the first embodiment will be omitted.

FIG. 23 shows a specific example of a type of plan 1402 called a compulsory type scenario. A series of plans 140211 to 140216 corresponds to answer sentences 150111 to 150116 configuring a survey related to a car. Although user utterance letter strings 170112 to 170116 in the plans 140212 to 140216 are displayed as "*", "*" means that it corresponds to every user utterance.

In the example shown, in FIG. 23, the plan 140210, being a plan which triggers a start of the compulsory type scenario, is not a part of the compulsory type scenario.

Each plan 140210 to 140216 respectively includes ID data 170210 to 170216 called "2000-01", "2000-02", "2000-03", "2000-04", "2000-05", "2000-06" and "2000-07". Also, each plan 140210 to 140216 respectively includes next plan prescription information 150210 to 150216. Also, although contents of the next plan prescription information 150216 are data called "2000-0F", a number "0F" after a hyphen is information indicating that a plan due to be transmitted next does not exist, and that the relevant answer sentence is an end of the survey.

In the example, in a case in which a user vocalizes (or inputs) a user utterance "I want a car" while a conversation between the user and the conversation control apparatus 1 is in progress, the planned conversation processor 320 starts an execution of the series of plans. That is, on the conversation control apparatus 1, or more specifically the planned conversation processor 320, receiving the user utterance "I want a car", the planned conversation processor 320 searches a plan space 1401, and investigates whether or not there is a plan 1402 which includes an answer sentence 1501 corresponding to the user utterance "I want a car".

In the example, it is taken that a user utterance letter string 170110 corresponding to "I want a car" corresponds to the plan 140210.

On the planned conversation processor 320 finding the plan 140210, it acquires the answer sentence 150110 included in the plan 140210 and, as well as transmitting the answer sentence 150110 "In that case, please answer a simple survey. There are five questions. If you are willing to answer the survey, please type in "I don't mind answering the survey"" as an answer corresponding to the user utterance, it specifies a next candidate answer sentence by means of the next plan prescription information 150210. In the example, the next plan prescription information 150210 includes the ID data "2000-02". The planned conversation processor 320 stores and retains an answer sentence of the plan 140211 corresponding to the ID data "2000-02" as the next candidate answer sentence.

In the event that a user answer, that is a user utterance, corresponding to the answer sentence "In that case, please answer a simple survey. There are five questions. If you are willing to answer the survey, please type in "I don't mind answering the survey"" is not "I don't mind answering the survey", the planned conversation processor 320, the talk space conversation control processor 330, or the CA conversation processor 340 carries out an output of some answer sentence corresponding to the user utterance, but does not go so far as to start the survey.

Meanwhile, in the event that a user utterance "I don't mind answering the survey" is accomplished, the planned conversation processor 320 selects the plan 140211 which has been prescribed as the next candidate answer sentence, and carries out an execution of the plan. That is, the planned conversation processor 320, as well as transmitting the answer sentence which is the answer sentence 150111 included in the plan 140211, specifies a next candidate answer sentence by means of the next plan prescription information 150211 included in the plan 140211. In the example, the next plan prescription information 150211 includes the ID data "2000-03". The planned conversation processor 320 takes the answer sentence included in the plan 140212 corresponding to the ID data "2000-03" to be the next candidate answer sentence. The implementation of the survey, which is the compulsory type scenario, now starts.

In the event that there is some user utterance in response to an answer sentence "Thank you. Here is the first question. If you buy a car, would you like a new car or a used one?" transmitted from the conversation control apparatus 1, the plan 140212 prescribed as the next candidate answer sentence is selected, and the plan is executed. That is, the planned conversation processor 320, as well as transmitting an answer "Question two. Would you prefer a Japanese car or a foreign car?", which is the answer sentence 150112 included in the plan 140212, specifies a next candidate answer sentence by means of the next plan prescription information 150212 included in the plan 140212. In the example, the next plan prescription information 150212 being "2000-04", the plan 140213 including the ID is selected as the next candidate answer sentence.

With the type of plan called the compulsory type scenario, as contents of a user utterance letter string 1701 are a symbol "*" indicating all of the user utterance contents, the planned conversation processor 320 executes the selected plan regardless of the contents of the user utterance. For example, even in the event of an answer such as "I don't know" or "I'll leave it" thought not to be an answer to the survey, it continues by carrying out a transmission of the answer sentence which is the next question.

Subsequently, the conversation control apparatus 1, or more specifically the planned conversation processor 320, every time it receives a user utterance, sequentially executes the plan 140213, the plan 140214, the plan 140215 and the plan 140216, regardless of the contents of the user utterance. That is, the conversation control apparatus 1, or more specifically the planned conversation processor 320, every time it receives a user utterance, sequentially transmits the answer sentences 150113 to 150116 "Question three. What kind of car? Would you like a sedan or a sports car, a wagon or a minivan?", "Question four. How much are you thinking of spending?", "Question five. When are you thinking you might buy?" and "There are no more questions. Thank you very much", which are the answer sentences of the plan 140213, the plan 140214, the plan 140215 and the plan 140216, regardless of the contents of the user utterance.

The planned conversation processor 320 recognizes from the next plan prescription information 150216 included in the plan 140216 that the relevant answer sentence is the end of the survey, and finishes the planned conversation process.

FIG. 24 is a diagram showing another example of the type of plan called the compulsory type scenario.

In the example shown in FIG. 23, a conversation control method is such that it proceeds with the survey questions regardless of whether or not the user utterance is an answer to the survey, but in the example shown in FIG. 24, a conversation control method is such that it proceeds to the next survey question only in the event that the user utterance is an answer to the survey while, in the event that it is not, it repeats the survey question in an attempt to acquire an answer to the survey.

The example in FIG. 24, being a plan including question sentences which configure a survey related to a car, as in FIG. 23, shows plans corresponding to a first question (refer to FIG. 23, plan 140211), a second question (refer to FIG. 23, plan 140212) and a third question (refer to FIG. 23, plan 140213) of the survey, but plans corresponding to a fourth question and onwards are omitted. A user utterance letter string 170124 is data indicating that the user utterance is neither "a new car" nor "a used car", while in the same way a user utterance letter string 170127 is data indicating that the user utterance is neither "a Japanese car" nor "a foreign car"

In the example in FIG. 24, it is taken that a user utterance "I don't mind answering the survey" has been accomplished. In this case, the planned conversation processor 320 searches the plan space 1401, and finds a plan 140221. It acquires an answer sentence 150121 included in the plan 140221 and, as well as transmitting the answer sentence 150121 "Thank you. Here is the first question. If you buy a car, would you like a new car or a used one?" as the answer corresponding to the user utterance, specifies a next candidate answer sentence by means of next plan prescription information 150221. In the example, the next plan prescription information 150221 includes three items of ID data "2000-02", "2000-03" and "2000-04". The planned conversation processor 320 stores and retains answer sentences of plan 140222, plan 140223 and plan 140224 corresponding to the three items of ID data "2000-02", "2000-03" and "2000-04" as next candidate answer sentences.

Herein, in the event that a user utterance "a new car" is accomplished in answer to the answer sentence "Thank you. Here is the first question. If you buy a car, would you like a new car or a used one?" transmitted from the conversation control apparatus 1, the planned conversation processor 320 selects the plan 140222, which includes a user utterance letter string 170122 corresponding to the user utterance, from among the three plans 140222, 140223 and 140224 prescribed as the next candidate answer sentences, and executes the plan. That is, the planned conversation processor 320, as well as transmitting an answer "Question two. Would you prefer a Japanese car or a foreign car?", which is an answer sentence 150122 included in the plan 140222, specifies a next candidate answer sentence by means of the next plan prescription information 150222 included in the plan 140222. In the example, the next plan prescription information 150222 includes three items of ID data "2000-06", "2000-07" and "2000-08". The planned conversation processor 320 selects an answer sentence included in three plans 140225, 140226 and 140227 which correspond to the three items of ID data "2000-06", "2000-07" and "2000-08", as the next candidate answer sentence. That is, the conversation control apparatus 1 is executing conversation control in such a way that, on finishing a collection of the answer "A new car" to the first survey question, it proceeds to an acquisition of an answer to the second survey question.

Meanwhile, in the event that a user utterance "a used car" is accomplished in answer to the answer sentence "Thank you. Here is the first question. If you buy a car, would you like a new car or a used one?" transmitted from the conversation control apparatus 1, the planned conversation processor 320 selects the plan 140223, which includes a user utterance letter string 170123 corresponding to the user utterance, from among the three plans 140222, 140223 and 140224 prescribed as the next candidate answer sentences, and executes the plan. That is, the planned conversation processor 320, as well as transmitting an answer "Question two. Would you prefer a Japanese car or a foreign car?", which is an answer sentence 150123 included in the plan 140223, specifies a next candidate answer sentence by means of next plan prescription information 150223 included in the plan 140223. In the example, the next plan prescription information 150223, in the same way as the above next plan prescription information 150222, includes three items of ID data "2000-06", "2000-07" and "2000-08". The planned conversation processor 320 selects an answer sentence included in three plans 140225, 140226 and 140227 which correspond to the three items of ID data "2000-06", "2000-07" and "2000-08", as the next candidate answer sentence. That is, the conversation control apparatus 1 is executing conversation control in such a way that, on finishing a collection of the answer "A used car" to the first survey question, it proceeds to an acquisition of an answer to the second survey question.

Also, in the event that a user utterance which is neither "a new car" nor "a used car", for example, "I don't know" or "Either is OK", is accomplished in answer to the answer sentence "Thank you. Here is the first question. If you buy a car, would you like a new car or a used one?" transmitted from the conversation control apparatus 1, the planned conversation processor 320 selects the plan 140224, which includes the user utterance letter string 170124 corresponding to the user utterance, from among the three plans 140222, 140223 and 140224 prescribed as the next candidate answer sentences, and executes the plan. That is, the planned conversation processor 320, as well as transmitting an answer "First, please answer question one. If you buy a car, would you like a new car or a used one?", which is an answer sentence 150124 included in the plan 140224, specifies a next candidate answer sentence by means of next plan prescription information 150224 included in the plan 140224. In the example, the next plan prescription information 150224 includes three items of ID data "2000-03", "2000-04" and "2000-05". The planned conversation processor 320 takes an answer sentence included in three plans 140222, 140223 and 140224 which correspond to the three items of ID data "2000-03", "2000-04" and "2000-05", to be the next candidate answer sentence. That is, the conversation control apparatus 1 executes conversation control which tries to collect an answer to the first survey question by repeating the first survey question to the user. To put this another way, the conversation control apparatus 1, or more specifically the planned conversation processor 320, repeats the first survey question to the user until the user produces a user utterance of either "A new car" or "A used car".

To proceed, a description will be given of a process after the planned conversation processor 320 has executed the above plan 140222 or 140223, and transmitted the answer sentence "Question two. Would you prefer a Japanese car or a foreign car?" In the event that a user utterance "a Japanese car" is accomplished in answer to the answer sentence "Question two. Would you prefer a Japanese car or a foreign car?" transmitted from the conversation control apparatus 1, the planned conversation processor 320 selects the plan 140225, which includes a user utterance letter string 170125 corresponding to the user utterance, from among the three plans 140225, 140226 and 140227 prescribed as the next candidate answer sentences, and executes the plan. That is, the planned conversation processor 320, as well as transmitting an answer "Question three. What kind of car? Would you like a sedan or a sports car, a wagon or a minivan?", which is an answer sentence 150125 included in the plan 140225, specifies a next candidate answer sentence by means of next plan prescription information 150225 included in the plan 140225. In the example, the next plan prescription information 150225 includes three items of ID data "2000-09", "2000-10" and "2000-11". The planned conversation processor 320 selects an answer sentence included in three plans which correspond to the three items of ID data "2000-09", "2000-10" and "2000-11", as the next candidate answer sentence. That is, at this point the conversation control apparatus 1 is executing conversation control in such a way that, on finishing a collection of the answer "A Japanese car" to the second survey question, it proceeds to an acquisition of an answer to the third survey question. The plans which correspond to "2000-09", "2000-10" and "2000-11" are omitted in FIG. 24.

Meanwhile, in the event that a user utterance "a foreign car" is accomplished in answer to the answer sentence "Question two. Would you prefer a Japanese car or a foreign car?" transmitted from the conversation control apparatus 1, the planned conversation processor 320 selects the plan 140226, which includes a user utterance letter string 170126 corresponding to the user utterance, from among the three plans 140225, 140226 and 140227 prescribed as the next candidate answer sentences, and executes the plan. That is, the planned conversation processor 320, as well as transmitting an answer "Question three. What kind of car? Would you like a sedan or a sports car, a wagon or a minivan?", which is an answer sentence 150126 included in the plan 140226, specifies a next candidate answer sentence by means of next plan prescription information 150226 included in the plan 140226. In the example, the next plan prescription information 150226 includes three items of ID data "2000-09", "2000-10" and "2000-11". The planned conversation processor 320 selects an answer sentence included in three plans which correspond to the three items of ID data "2000-09", "2000-10" and "2000-11", as the next candidate answer sentence. That is, the conversation control apparatus 1 is executing conversation control in such a way that, on finishing a collection of the answer "A foreign car" to the second survey question, it proceeds to an acquisition of an answer to the third survey question.

Also, in the event that a user utterance which is neither "A Japanese car" nor "A foreign car", for example, "I don't know" or "Either is OK", is accomplished in answer to the answer sentence "Question two. Would you prefer a Japanese car or a foreign car?" transmitted from the conversation control apparatus 1, the planned conversation processor 320 selects the plan 140227, which includes the user utterance letter string 170127 corresponding to the user utterance, from among the three plans 140225, 140226 and 140227 prescribed as the next candidate answer sentences, and executes the plan. That is, the planned conversation processor 320, as well as transmitting an answer "First, please answer question two. Would you prefer a Japanese car or a foreign car?", which is an answer sentence 150127 included in the plan 140227, specifies a next candidate answer sentence by means of next plan prescription information 150227 included in the plan 140227. In the example, the next plan prescription information 150227 includes three items of ID data "2000-06", "2000-07" and "2000-08". The planned conversation processor 320 takes an answer sentence included in the three plans 140225, 140226 and 140227 which correspond to the three items of ID data "2000-06", "2000-07" and "2000-08", to be the next candidate answer sentence. That is, the conversation control apparatus 1 executes conversation control which tries to collect an answer to the second survey question by repeating the second survey question to the user. To put this another way, the conversation control apparatus 1, or more specifically the planned conversation processor 320, repeats the second survey question to the user until the user produces a user utterance of either "A Japanese car" or "A foreign car".

Hereafter, the conversation control apparatus 1, or more specifically the planned conversation processor 320, carries out a collection of an answer from the third survey question to a fifth survey question by means of a conversation control method identical to that described heretofore.

According to the kind of conversation control apparatus according to the second embodiment, it is possible to provide a conversation control apparatus capable of acquiring an answer to a predetermined matter, in a predetermined order, even in the event that the user utterance contents differ from an original objective.

What is claimed is:

1. A conversation control apparatus comprising:
a processor causing an execution of a control which transmits an answer sentence in response to a user utterance; and
a memory storing a plurality of plans each including the answer sentence and next candidate prescription information which prescribes a next candidate answer sentence, which is an answer sentence due to be transmitted in an order succeeding the answer sentence, wherein the processor:
in response to a first user utterance, selects a plan stored in the memory, causes the selected plan to transmit an answer sentence included in the plan and, subsequently, in response to a second user utterance, based on next candidate prescription information included in the plan, causes a transmission of a next candidate answer sentence;

regardless of contents of a user utterance, causes a transmission of a predetermined answer sentence and next candidate answer sentence in a predetermined order;

in the event that a user utterance letter string indicating the user utterance contents includes a symbol indicating all of the user utterance contents, a plan of a compulsory type scenario is managed, wherein the plan of the compulsory type scenario transmits answer sentences in such a way that predetermined answer sentences are caused to be output in a predetermined order; and, before starting the compulsory type scenario, the processor transmits answer sentences asking whether the compulsory type scenario may be started, and the processor starts the compulsory type scenario after getting a user utterance which is positive for answering the compulsory type scenario.

* * * * *